United States Patent
Ueda

(10) Patent No.: US 9,432,606 B2
(45) Date of Patent: Aug. 30, 2016

(54) IMAGE PICKUP APPARATUS INCLUDING IMAGE PICKUP ELEMENT HAVING IMAGE PICKUP PIXEL AND FOCUS DETECTION PIXEL AND SIGNAL PROCESSING METHOD

(71) Applicant: CANON KABUSHIKI KAISHA, Tokyo (JP)

(72) Inventor: Toshiharu Ueda, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/713,057

(22) Filed: May 15, 2015

(65) Prior Publication Data

US 2015/0249799 A1 Sep. 3, 2015

Related U.S. Application Data

(62) Division of application No. 13/793,279, filed on Mar. 11, 2013, now Pat. No. 9,065,988.

(30) Foreign Application Priority Data

Mar. 30, 2012 (JP) ................................. 2012-081787

(51) Int. Cl.
*H04N 5/378* (2011.01)
*H04N 5/21* (2006.01)
(Continued)

(52) U.S. Cl.
CPC .......... *H04N 5/378* (2013.01); *G02B 13/0015* (2013.01); *H04N 5/21* (2013.01); *H04N 5/357* (2013.01); *H04N 5/3572* (2013.01); *H04N 5/3696* (2013.01); *H04N 5/3765* (2013.01)

(58) Field of Classification Search
CPC .... G02B 13/0015; H04N 5/21; H04N 5/357; H04N 5/3572; H04N 5/3696; H04N 5/3765; H04N 5/378
See application file for complete search history.

(56) References Cited

U.S. PATENT DOCUMENTS 7,474,352 B2 * 1/2009 Oikawa .............. H04N 5/23212 348/208.12
8,149,324 B2 * 4/2012 Oikawa .............. H04N 5/23212 250/231.16
(Continued)

FOREIGN PATENT DOCUMENTS

CN 101630110 A 1/2010
CN 101971610 A 2/2011
(Continued)

OTHER PUBLICATIONS

The above foreign patent documents were cited in the Jan. 19, 2016 Japanese Office Action, which is enclosed without an English Translation, that issued in Japanese Patent Application No. 2012-081787.
(Continued)

*Primary Examiner* — Amy Hsu
(74) *Attorney, Agent, or Firm* — Cowan, Liebowitz & Latman, P.C.

(57) ABSTRACT

An image pickup apparatus 100 includes an image pickup element 101 including a plurality of image pickup pixels that perform a photoelectric conversion for an image formed by a light beam from an image pickup optical system and a plurality of focus detection pixels that perform a photoelectric conversion for an image formed by a divided light beam of the light beam from the image pickup optical system, and a DSP 103 configured to perform a shading correction for a pixel signal from the image pickup element 101, the image pickup element 101 generates a first pixel signal by adding signals from the plurality of image pickup pixels, and generates a second pixel signal without adding a signal from the focus detection pixel, and the DSP 103 performs the shading correction for the first pixel signal and the second pixel signal using correction data different from each other.

17 Claims, 15 Drawing Sheets

(51) Int. Cl.
*H04N 5/357* (2011.01)
*H04N 5/369* (2011.01)
*G02B 13/00* (2006.01)
*H04N 5/376* (2011.01)

(56) References Cited

U.S. PATENT DOCUMENTS

| | | | |
|---|---|---|---|
| 8,749,695 B2* | 6/2014 | Kita | H04N 5/23212 348/294 |
| 2004/0179128 A1* | 9/2004 | Oikawa | H04N 5/23212 348/345 |
| 2009/0066832 A1* | 3/2009 | Hirasawa | H04N 5/23296 348/345 |
| 2010/0013947 A1* | 1/2010 | Oikawa | H04N 5/23212 348/222.1 |
| 2010/0045849 A1* | 2/2010 | Yamasaki | G03B 3/10 348/349 |
| 2010/0073527 A1* | 3/2010 | Ichimiya | H04N 5/367 348/247 |
| 2011/0141329 A1* | 6/2011 | Nakagawa | G02B 7/34 348/294 |
| 2011/0234861 A1* | 9/2011 | Endo | H04N 5/3572 348/243 |
| 2012/0092545 A1* | 4/2012 | Sugawara | G02B 7/285 348/345 |
| 2012/0105688 A1* | 5/2012 | Kita | H04N 5/359 348/242 |
| 2012/0147227 A1* | 6/2012 | Yoshimura | G02B 7/346 348/246 |
| 2013/0021521 A1* | 1/2013 | Hamada | H04N 5/23212 348/360 |
| 2013/0258155 A1* | 10/2013 | Ueda | H04N 5/21 348/308 |

FOREIGN PATENT DOCUMENTS

| | | |
|---|---|---|
| CN | 102090053 A | 6/2011 |
| JP | 2005-277618 A | 10/2005 |
| JP | 2009-244858 A | 10/2009 |
| JP | 2011-124712 A | 6/2011 |

OTHER PUBLICATIONS

The above references were cited in a Dec. 1, 2015 Chinese Office Action, which is enclosed with an English Translation, that issued in Chinese Patent Application No. 201310108941.2.

* cited by examiner

IMAGE PICKUP APPARATUS INCLUDING IMAGE PICKUP ELEMENT HAVING IMAGE PICKUP PIXEL AND FOCUS DETECTION PIXEL AND SIGNAL PROCESSING METHOD

CROSS-REFERENCE TO RELATED APPLICATION

This application is a divisional of application Ser. No. 13/793,279, filed Mar. 11, 2013, the entire disclosure of which is hereby incorporated by reference.

BACKGROUND OF THE INVENTION

Field of the Invention

The present invention relates to an image pickup apparatus that includes an image pickup element having an image pickup pixel and a focus detection pixel.

Description of the Related Art

Previously, in an image pickup apparatus that uses an image pickup element such as a CMOS sensor, shading (an offset amount) in a dark situation that is generated in taking an image is reduced by performing a predetermined correction processing. Japanese Patent Laid-Open No. 2003-333434 discloses a horizontal dark shading correction that is performed in a developing processing using one-dimensional correction data that are obtained by performing a projection calculation for an image taken in the dark situation.

In order to improve the performance of the image pickup apparatus, a configuration that does not need an AF sensor for exclusive use by providing a phase difference detection function to the image pickup element so as to achieve a high-speed phase difference AF is known. Japanese Patent Laid-Open No. 2010-20055 discloses an image pickup apparatus that includes an image pickup element having common pixels (image pickup pixels) and focus detection pixels. This image pickup apparatus has an addition readout mode such as an electronic view finder mode or a moving picture shooting mode in which outputs of the plurality of image pickup pixels are added to be read. Japanese Patent Laid-Open No. 2010-20055 discloses an image pickup apparatus that has a mode of performing an addition processing for the image pickup pixels and reading only the focus detection pixel without performing the addition processing (with a non-addition processing) when the focus detection pixel is contained.

However, when pixels such as the image pickup pixels (addition pixels) and the focus detection pixels (non-addition pixels) that are read using different drive patterns are mixed in one frame, a difference of characteristics is generated by the influence of a circuit configuration or the like. For example, when an electric circuit that performs the addition processing exists inside the image pickup element, a switch element such as a transistor is disposed between pixels to be added. On the other hand, since the addition processing is not performed for an output of the focus detection pixel (non-addition), any switch element is not disposed between the focus detection pixels. Therefore, in accordance with the influence of a variation of an individual threshold value of each switch, the shading (the offset amount) is different between at the addition time and at the non-addition time. Furthermore, since the focus detection pixel performs a pupil division, an opening by a wiring layer is different from that of the common pixel. Therefore, a difference is generated in a wiring capacity and the offset amount is different between the common pixel and the focus detection pixel. Accordingly, even when a shading correction (an offset correction) is performed for the output of the common pixel (the image pickup pixel), it is not necessarily appropriate for the output of the focus detection pixel, and therefore an image quality may be deteriorated.

SUMMARY OF THE INVENTION

The present invention provides an image pickup apparatus and a signal processing method that perform an appropriate shading correction for a pixel output from an image pickup element having an image pickup pixel and a focus detection pixel so as to reduce a deterioration of an image quality.

An image pickup apparatus as one aspect of the present invention includes an image pickup element including a plurality of image pickup pixels that perform a photoelectric conversion for an image formed by a light beam from an image pickup optical system and a plurality of focus detection pixels that perform a photoelectric conversion for an image formed by a divided light beam of the light beam from the image pickup optical system, and a signal processor configured to perform a shading correction for a pixel signal from the image pickup element, the image pickup element generates a first pixel signal by adding signals from the plurality of image pickup pixels, and generates a second pixel signal without adding a signal from the focus detection pixel, and the signal processor performs the shading correction for the first pixel signal and the second pixel signal using correction data different from each other.

A signal processing method as another aspect of the present invention is a method of processing a pixel signal from an image pickup element including a plurality of image pickup pixels that perform a photoelectric conversion for an image formed by a light beam from an image pickup optical system and a plurality of focus detection pixels that perform a photoelectric conversion for an image formed by a divided light beam of the light beam from the image pickup optical system, and the signal processing method includes the steps of generating a first pixel signal by adding signals from the plurality of image pickup pixels, and generating a second pixel signal without adding a signal from the focus detection pixel, and performing a shading correction for the first pixel signal and the second pixel signal using correction data different from each other.

Further features and aspects of the present invention will become apparent from the following description of exemplary embodiments with reference to the attached drawings.

BRIEF DESCRIPTION OF THE DRAWINGS

FIGS. 4A and 4B are pixel arrangement diagrams in an opening region of the image pickup element in Embodiment 1.

DESCRIPTION OF THE PREFERRED EMBODIMENTS

Figure 1:
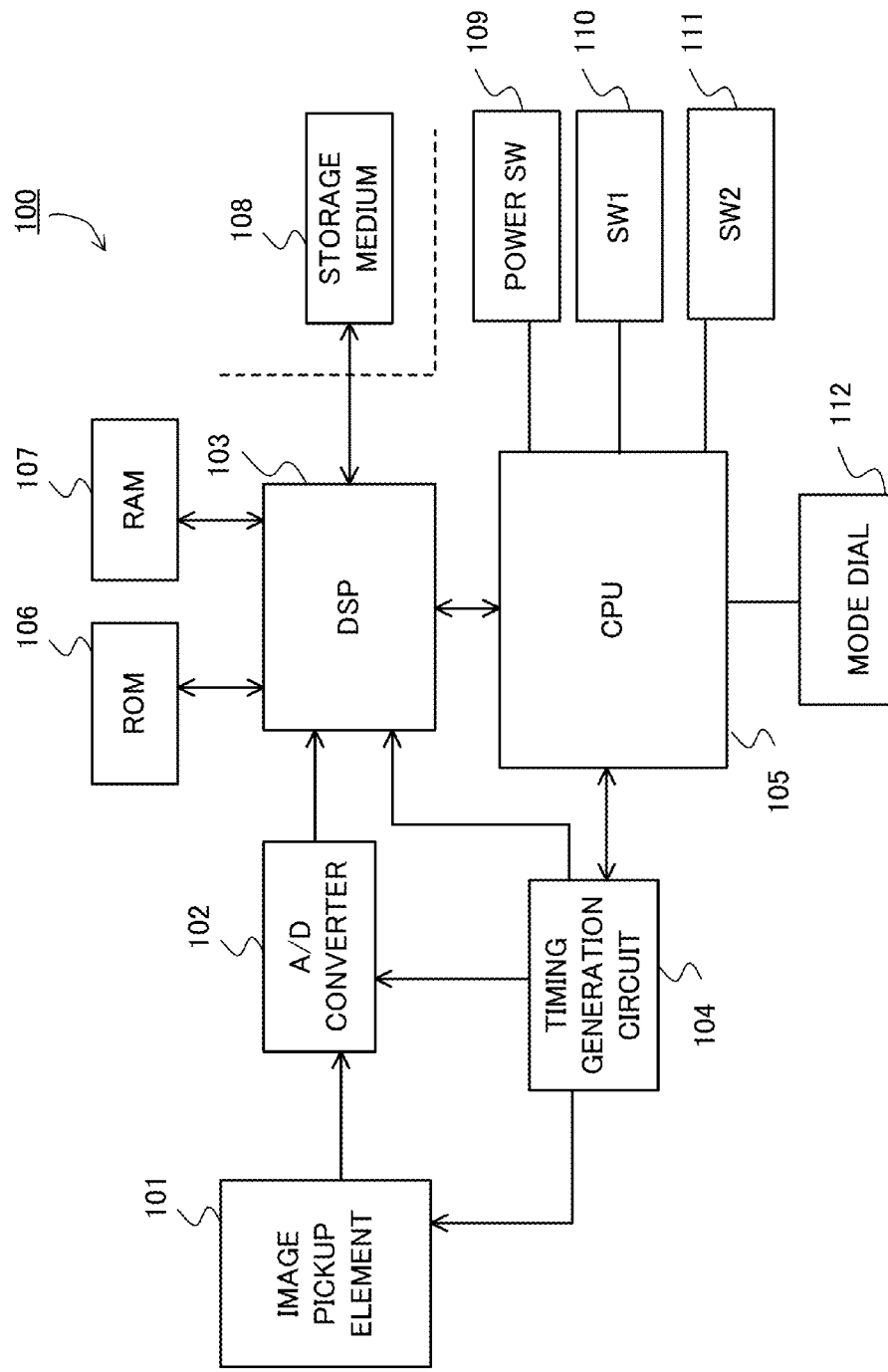
FIG. 1 is a block diagram of an image pickup apparatus in Embodiment 1.

Exemplary embodiments of the present invention will be described below with reference to the accompanied drawings. In each of the drawings, the same elements will be denoted by the same reference numerals and the duplicate descriptions thereof will be omitted.

[Embodiment 1]

First of all, referring to FIG. 1, a configuration and an operation of an image pickup apparatus (a camera) in Embodiment 1 of the present invention will be described. FIG. 1 is a block diagram of an image pickup apparatus 100 in the present embodiment. Reference numeral 101 denotes an image pickup element such as a CMOS sensor. The image pickup element 101 includes a plurality of image pickup pixels that perform a photoelectric conversion for an image formed by a light beam from an image pickup optical system (a lens apparatus) and a plurality of focus detection pixels that performs the photoelectric conversion for an image formed by light beams divided from the light beam from the image pickup optical system. The image pickup element 101, as described below, generates a first pixel signal by adding signals from the plurality of image pickup pixels, and also generates a second pixel signal without adding a signal from the focus detection pixel. Reference numeral 102 denotes an A/D converter that converts a signal (an analog signal) outputted from the image pickup element 101 into a digital signal.

Reference numeral 103 denotes a DSP (Digital Signal Processor), which is a signal processor that performs various kinds of correction processings and developing processings for data outputted from the A/D converter 102. The DSP 103 also performs controls of various kinds of memories such as a ROM 106 and a RAM 107 and a write processing of image data to a storage medium 108. Especially, in the present embodiment, the DSP 103 performs a shading correction for an image signal from the image pickup element 101. In this case, the DSP 103 performs the shading correction using correction data different from each other for the first pixel signal and the second pixel signal.

Reference numeral 104 denotes a timing generation circuit that supplies a control signal to the image pickup element 101, the A/D converter 102, and the DSP 103, which is controlled by a CPU 105. Reference numeral 105 denotes the CPU that performs controls of the DSP 103 and the timing generation circuit 104, and also performs a control of a camera function by each part (not shown). The CPU 105 is connected to a power switch 109 (power SW), a shutter switch 110 (SW1), a shutter switch 111 (SW2), a mode dial 112, and the like, and the CPU 105 performs a processing depending on a state of each part. Reference numeral 106 denotes the ROM (a memory) that stores a control program of the image pickup apparatus 100 and various kinds of correction data. Reference numeral 107 denotes the RAM (a memory) that temporarily stores the image data and the correction data that are processed by the DSP 103. Various kinds of correction data that are obtained in a step of the present embodiment are previously stored in the ROM 106, which are expanded to the RAM 107 at the time of taking an image so as to be used for the correction of the image data. Reference numeral 108 denotes the storage medium that stores a shot image, which is connected to the image pickup apparatus 100 via a connecter (not shown).

Reference numeral 109 denotes the power switch (power SW) that runs the image pickup apparatus 100. Reference numeral 110 denotes the shutter switch (SW1) that instructs a start of the image pickup operation. Reference numeral 111 denotes the shutter switch (SW2) that instructs a start of sequential image pickup operations of writing the signal read from the image pickup element 101 into the storage medium 108 via the A/D converter 102 and the DSP 103. Reference numeral 112 denotes the mode dial that selects an operation mode of the image pickup apparatus 100.

Figure 2:
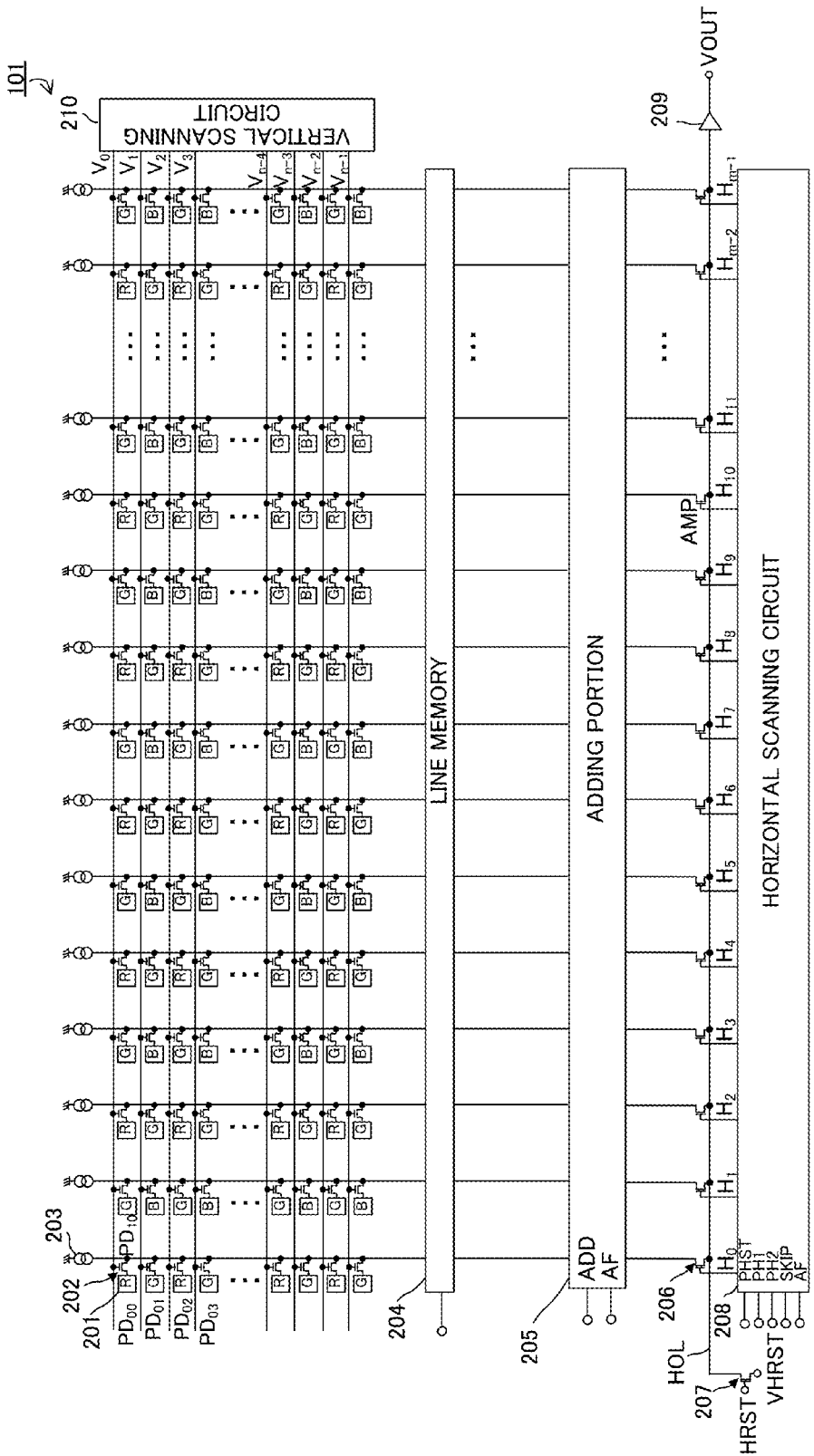
FIG. 2 is a block diagram of an image pickup element in Embodiment 1.

Next, referring to FIG. 2, a configuration and an operation of the image pickup element 101 will be described. FIG. 2 is a block diagram of the image pickup element 101, which illustrates a minimum configuration needed for describing a readout operation described below, and a pixel reset signal and the like are omitted.

In FIG. 2, reference numeral 201 denotes a photoelectric conversion portion (hereinafter, in some cases, referred to as a "$PD_{mn}$" in which symbol m (m=0, 1, . . ., m−1) denotes an address in an X direction and symbol n (n=0, 1, . . . , n−1) denotes an address in a Y direction). The photoelectric conversion portion 201 includes a photodiode, a pixel amplifier, a reset switch, and the like. The image pickup element 101 is configured by arranging m×n photoelectric conversion portions 201 in two dimensions. In FIG. 2, a sign indicating the photoelectric conversion portion 201 is only added to the photoelectric conversion portions $PD_{00}$ to $PD_{03}$ at the upper left in order to avoid complication. Each of symbols R, G, and B added to the corresponding photoelectric conversion portion 201 indicates a color filter, and the color filters of the present embodiment are arranged by so-called a Bayer array.

Reference numeral 202 denotes a switch that selects an output of the photoelectric conversion portion 201, which is selected for each row by a vertical scanning circuit 210. Reference numeral 203 denotes a constant current source that is a load of a pixel amplifier (not shown) of the photoelectric conversion portion 201, which is arranged on each of vertical output lines. Reference numeral 204 denotes a line memory that temporarily stores the output of the photoelectric conversion portion 201, which stores the output of the photoelectric conversion portion 201 for one row selected by the vertical scanning circuit 210. As the line memory 204, commonly, a capacitor is used.

Reference numeral 205 denotes an adding portion that adds signal charges of a plurality of pixels in a horizontal direction. The adding portion 205 is controlled by two control signals inputted to an ADD terminal and an AF terminal, and adds the signal charges of the pixels in the horizontal direction while performing an addition readout described below. The ADD terminal of the adding portion 205 is an input terminal of a signal that switches an addition and non-addition. When a control signal of a low level (L-level) is inputted to the ADD terminal, the non-addition is selected. On the other hand, when the control signal of a high level (H-level) is inputted to the ADD terminal, the addition is selected. The AF terminal of the adding portion 205 is an input terminal that is used in selectively reading the focus detection pixels (a focus detection pixel group) included in the image pickup element 101 by the non-addition. The adding portion 205, similarly to a horizontal scanning circuit 208, functions as a selector that selects the signal charge of the pixel that is to be outputted.

Reference numeral 206 denotes switches ($H_0$ to $H_{m-1}$) that sequentially output the outputs of the photoelectric conversion portions 201 stored in the line memory 204. When the horizontal scanning circuit 208 sequentially scans the switches 206 ($H_0$ to $H_{m-1}$), one-row outputs of the photoelectric conversion are read. Reference numeral 207 denotes a switch that is connected to a horizontal output line HOL and that resets the horizontal output line HOL to a voltage VHRST, which is controlled by a signal HRST. Reference numeral 208 denotes the horizontal scanning circuit, which sequentially scans the outputs of the photoelectric conversion portions 201 stored in the line memory 204 so as to be outputted to the horizontal output line HOL. The horizontal scanning circuit 208 also functions as a selector that selects a necessary pixel by the control of the CPU 105.

In the horizontal scanning circuit 208, a PHST terminal is a data input terminal of the horizontal scanning circuit 208. Each of a PH1 terminal and a PH2 terminal is a shift clock input terminal. The data inputted to the PHST terminal is set by changing the PH1 terminal to the H-level. Then, the data inputted to the PHST terminal is latched by changing the PH2 terminal to the H-level. When a shift clock is inputted to each of the PH1 terminal and the PH2 terminal, input signals of the PHST terminal are sequentially shifted to drive the horizontal scanning circuit 208 and therefore the switches 206 ($H_0$ to $H_{m-1}$) can be sequentially turned on.

A SKIP terminal of the horizontal scanning circuit 208 is a control input terminal that performs a setting of the horizontal scanning circuit 208 while performing a thinning readout and the addition readout described above. When the SKIP terminal is set to be the H-level, the scanning of the horizontal scanning circuit 208 is skipped at predetermined intervals (for example, like H2, H5, H8, . . . ), and pixel outputs can be read while thinning them. Furthermore, setting the AF terminal along with the SKIP terminal, the readouts of the pixel outputs can be performed by making a period of the skip different. The details of the readout operation will be described below. Reference numeral 209 denotes a buffer amplifier of the pixel signals that are sequentially outputted from the horizontal output line HOL.

Reference numeral 210 denotes the vertical scanning circuit. The vertical scanning circuit 210 sequentially performs a scanning to output signals $V_0$ to $V_{n-1}$ so as to select the switch 202 of the photoelectric conversion portion 201. The vertical scanning circuit 210 is, similarly to the horizontal scanning circuit 208, controlled by a data input terminal PVST (not shown), shift clock input terminals PV1 and PV2 (not shown), and a SKIP terminal (not shown) that is used for setting the thinning readout. Since the operation of the vertical scanning circuit 210 is similar to that of the horizontal scanning circuit 208, its detailed descriptions are omitted. In addition, for easy descriptions, descriptions of the adding function in the vertical direction are omitted.

Figure 3:
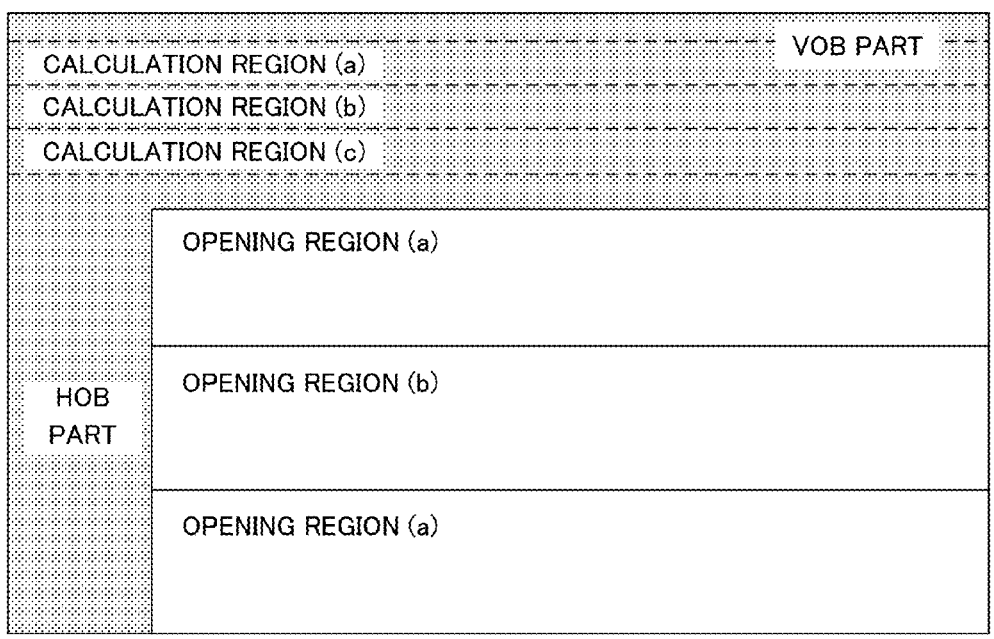
FIG. 3 is a pixel arrangement diagram of the image pickup element in Embodiment 1.

Next, referring to FIGS. 3, 4A, and 4B, a pixel arrangement of the image pickup element 101 will be described. FIG. 3 is a pixel arrangement diagram of the image pickup element 101. In FIG. 3, a region indicated by a gray color is a light shielding region, which is an optical black region that is used as a reference region. The other region is an opening region (a correction region). In the optical black region, an upper part of a screen is called a VOB part (a vertical optical black region) that is a vertical reference region, and a left side of the screen is called a HOB part (horizontal optical black region).

A part of the VOB part (the vertical optical black region) in the vertical direction constitutes a calculation region that is used to calculate horizontal shading data. In the present embodiment, the output of the image pickup element 101 is read with reference to an output of this calculation region, and also an amount of a horizontal shading correction is calculated. In order to be available for the adding operation described below, this calculation region is divided into regions which are driven by a first drive pattern corresponding to a row which only includes a common pixel (the image pickup pixel) and second and third drive patterns corresponding to a row including the focus detection pixel. Then, when the correction region started from the opening region is read, the horizontal shading correcting calculation is performed and the result is outputted. During this time, the readout operation of the image pickup element 101 is continuously performed regardless of the calculation region or the correction region. In the opening region, there are an opening region (a) in which all pixels are configured by the common pixels (the image pickup pixels) and an opening region (b) in which the focus detection pixel is partially arranged in the common pixels.

Figures 4A, 4B:
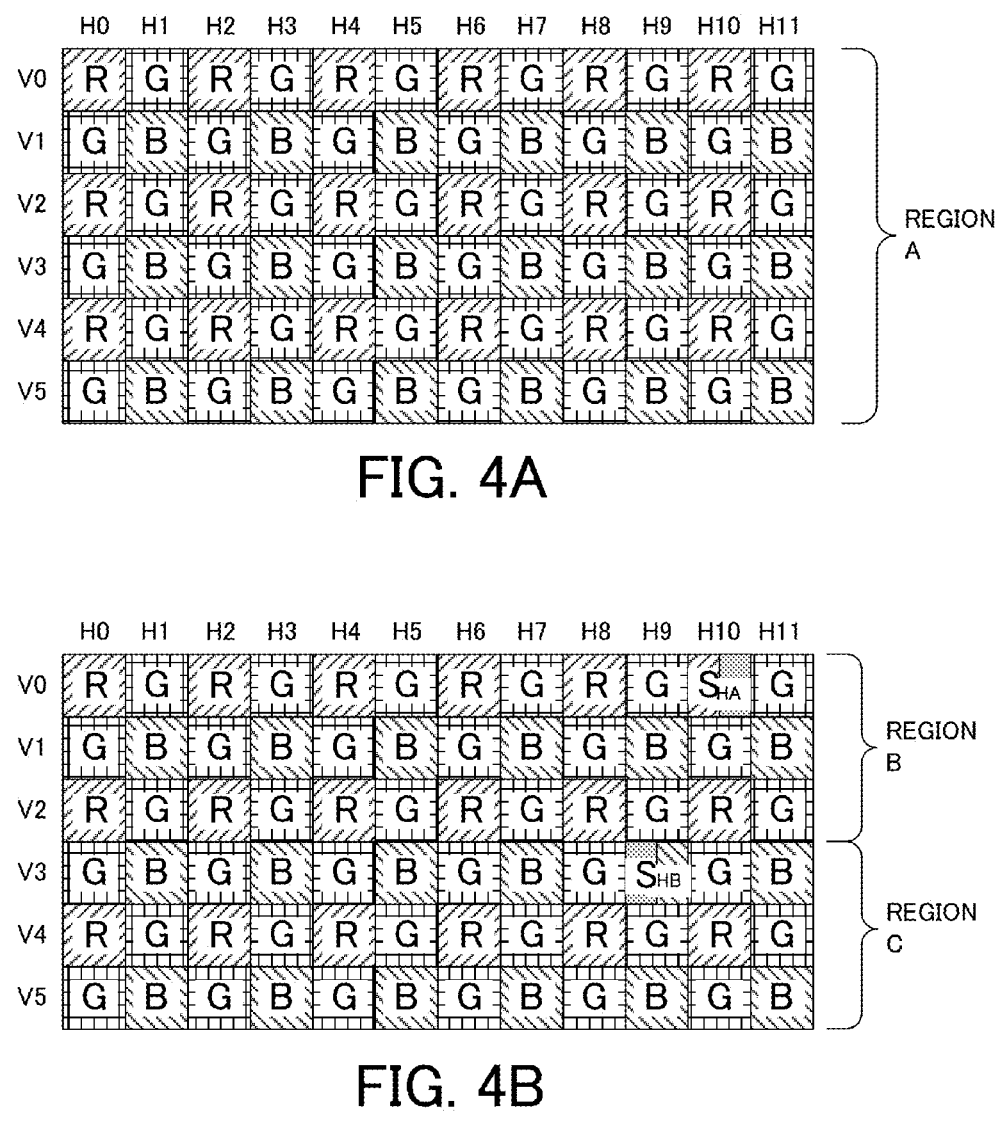

FIGS. 4A and 4B are pixel arrangement diagrams in the opening regions of the image pickup element 101. The pixel arrangement of the present embodiment has basically a 2×2 Bayer array. Also, in the pixel arrangement of the present embodiment, a 12×6 pixel pattern is a basic unit, and a pair of focus detection pixels $S_{HA}$ and $S_{HB}$ is arranged in the pixel pattern. However, the present embodiment is not limited to this, and the embodiment can also be applied to a pixel pattern having another basic unit. FIG. 4A illustrates an opening region (a) of FIG. 3, which is a region configured only by the common pixels (the image pickup pixels). On the other hand, FIG. 4B illustrates the opening region (b) of FIG. 3. In the opening region (b), the $S_{HA}$ pixel (the focus detection pixel) that is a standard pixel used for the focus detection by a phase difference detection method is disposed at an address (0, 10), and the $S_{HB}$ pixel (the focus detection pixel) that is a reference pixel used for the focus detection by the phase difference detection method is disposed at an address (9, 3).

The focus detection by the phase difference detection method needs two focus detection pixels of the standard pixel and the reference pixel. The image pickup element 101 of the present embodiment is configured by repeatedly arranging a 12×6 pixel pattern (a basic unit) so as to have a total of m×n pixels. Furthermore, in the image pickup element 101 of the present embodiment, the pair of standard pixel ($S_{HA}$ pixel) and reference pixel ($S_{HB}$ pixel) are arranged so as to be distant from each other with respect to the 12×6 pixel pattern. Thus, in the image pickup element 101 of the present embodiment, a minimum number of focus detection pixels are disposed with respect to the 12×6 pixel pattern (the basic unit). Therefore, a distribution density of the image pickup pixels is heightened, and the deterioration of an image quality can be prevented.

Figure 5A:
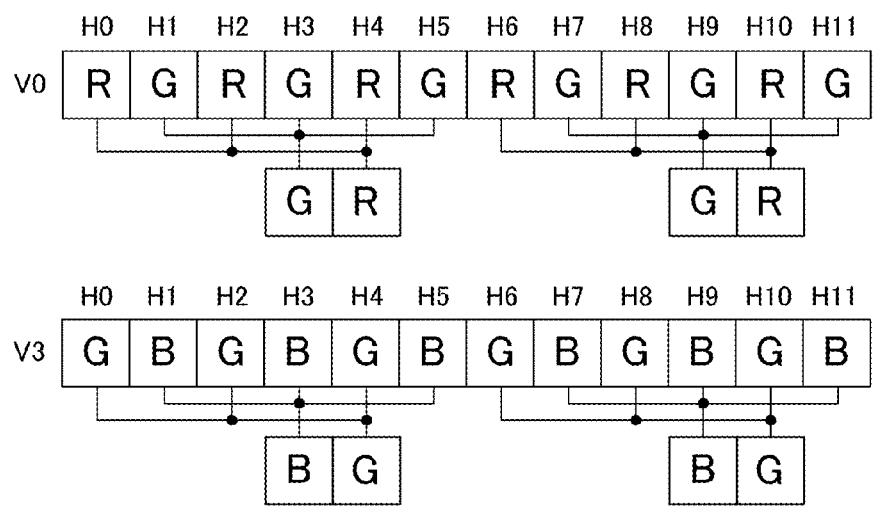
FIGS. 5A to 5C are diagrams of describing addition readout of the image pickup element in Embodiment 1.
Figure 5B:
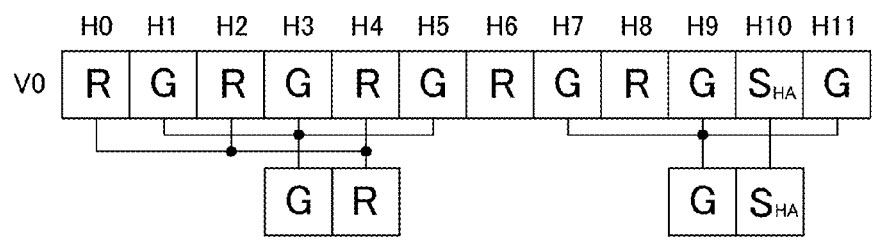
Figure 5C:
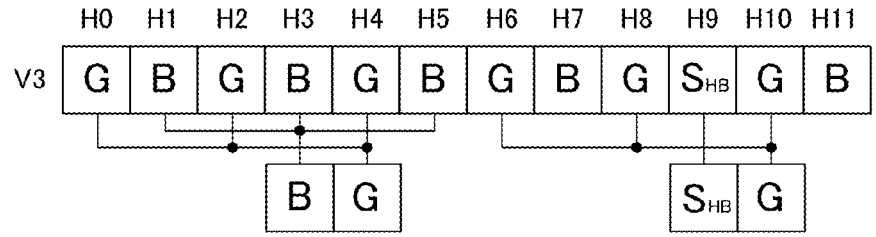

Next, referring to FIGS. 5A to 5C, the addition readout in the present embodiment will be described. FIGS. 5A to 5C are diagrams of describing the addition readout, which schematically illustrate the readout for two rows of V0 and V3 rows that are first read in the pixel arrangement illustrated in FIGS. 4A and 4B. In each drawing, the arrangement at the upper side corresponds to a pixel portion, and the arrangement at the lower side corresponds to a readout pixel output.

First of all, in order to perform the addition readout, before the readout of the pixel signal is performed, the SKIP terminal of the horizontal scanning circuit 208 and the ADD terminal of the adding portion 205 are set to be the H-level and the AF terminal is set to be the H-level. Next, the vertical scanning circuit 210 selects the V0 row so as to transfer the pixel signals $H_0$ to $H_{m-1}$ that are pixel outputs of the V0 row to the line memory 204. Then, the adding portion 205 adds the pixel signals in accordance with the setting of the ADD terminal and the AF terminal. In this case, basically, the pixel signals having the same color are added for a three-pixel unit.

FIG. 5A illustrates the V0 and V3 rows of a region A in FIG. 4A. The region A is a region in which all the pixels are the common pixels (the image pickup pixels), and signals obtained by adding the three pixels having the same color for all the pixels are outputted to an outside of the image pickup element 101. In the present embodiment, a drive pattern in this case is referred to as a first drive pattern. On the other hand, FIG. 5B illustrates the V0 row in a region B of FIG. 4B. The region B includes the focus detection pixel $S_{HA}$ as well as the common pixel, and three pixels are added to obtain a signal when all the pixels to be added are the common pixel, and on the other hand, a signal is outputted without adding these pixels when the focus detection pixel $S_{HA}$ is included in the three pixels. In FIG. 5B, among H6, H8, and H10 columns, the H6 and H8 columns are the common pixel and the H10 column is the focus detection pixel $S_{HA}$. Therefore, the signals obtained from these pixels are not added.

Then, the data inputted to the PHST terminal of the horizontal scanning circuit 208 are sequentially scanned by transfer pulses of the PH1 terminal and the PH2 terminal so as to drive the horizontal scanning circuit 208. In this case, the horizontal scanning circuit 208 scans the switches 206 in order of H3, H4, H9, H10, . . . , in accordance with the settings of the SKIP terminal and the AF terminal. When all the pixels to be added are the common pixel, the added signal of the common pixels is outputted via the buffer amplifier 209. On the other hand, when the focus detection pixel is included in the pixels to be added, the signal of the focus detection pixel is only outputted without adding the signals from these pixels. The drive pattern in this case is referred to as a second drive pattern.

When the readout of the V0 row is completed, the vertical scanning circuit 210 performs an interlace scanning to select the V3 row, and the pixel signals of $H_0$ to $H_{m-1}$ that are pixel outputs of the V3 row are transferred to the line memory 204. In this case, the adding portion 205 adds a predetermined pixel signal in accordance with the settings of the ADD terminal and the AF terminal of the adding portion 205.

Similarly, FIG. 5C illustrates a V3 row in a region C of FIG. 4B. The region C includes the focus detection pixel $S_{HB}$ as well as the common pixel, the signal is obtained by adding three pixels when all the pixels to be added are the common pixel, and on the other hand, the signal is outputted without adding these pixels when the focus detection pixel $S_{HB}$ is included in the three pixels. In FIG. 5C, among H7, H9, and H11 columns, the H7 and H11 columns are the common pixel and the H9 column is the focus detection pixel $S_{HB}$. Therefore, the signals obtained from the pixels of the H7, H9, and H11 columns are not added.

Then, the data inputted to the PHST terminal of the horizontal scanning circuit 208 are sequentially scanned by transfer pulses of the PH1 terminal and the PH2 terminal so as to drive the horizontal scanning circuit 208. In this case, the horizontal scanning circuit 208 scans the switches 206 in order of H3, H4, H9, and H10 in accordance with the settings of the SKIP terminal and the AF terminal. When all the pixels to be added are the common pixel (the image pickup pixel), the added signal of the common pixels is outputted via the buffer amplifier 209. On the other hand, when the focus detection pixel is included in the pixels to be added, the signal of the focus detection pixel is only outputted without adding the signals from these pixels. The drive pattern in this case is referred to as a third drive pattern.

Hereinafter, similarly, while the vertical scanning circuit 210 and the horizontal scanning circuit 208 perform the interlace scanning, the addition readout of the image pickup element 101 is performed. In the present embodiment, the focus detection pixel is corrected as a defect pixel and therefore the deterioration of the image quality in generating an image can be reduced. In other words, the CPU 105, in the addition readout mode, complements the common pixel (the image pickup pixel) that corresponds to the focus detection pixel. Thus, in the present embodiment, in the opening region (b) illustrated in FIG. 4B, the focus detection pixel at the H10 column is read with respect to the V0 row, and the focus detection pixel at the H9 column is read with respect to the V3 row. As a result, according to the configuration of the present embodiment, a phase difference AF can be performed at the time of the addition readout. The calculation region (a) of the VOB part illustrated in FIG. 3 is driven using the first drive pattern that is the same as that of FIG. 5A, the calculation region (b) is driven using the second drive pattern that is the same as that of FIG. 5B, and the calculation region (c) is driven using the third drive pattern that is the same as that of FIG. 5C.

Figure 6:
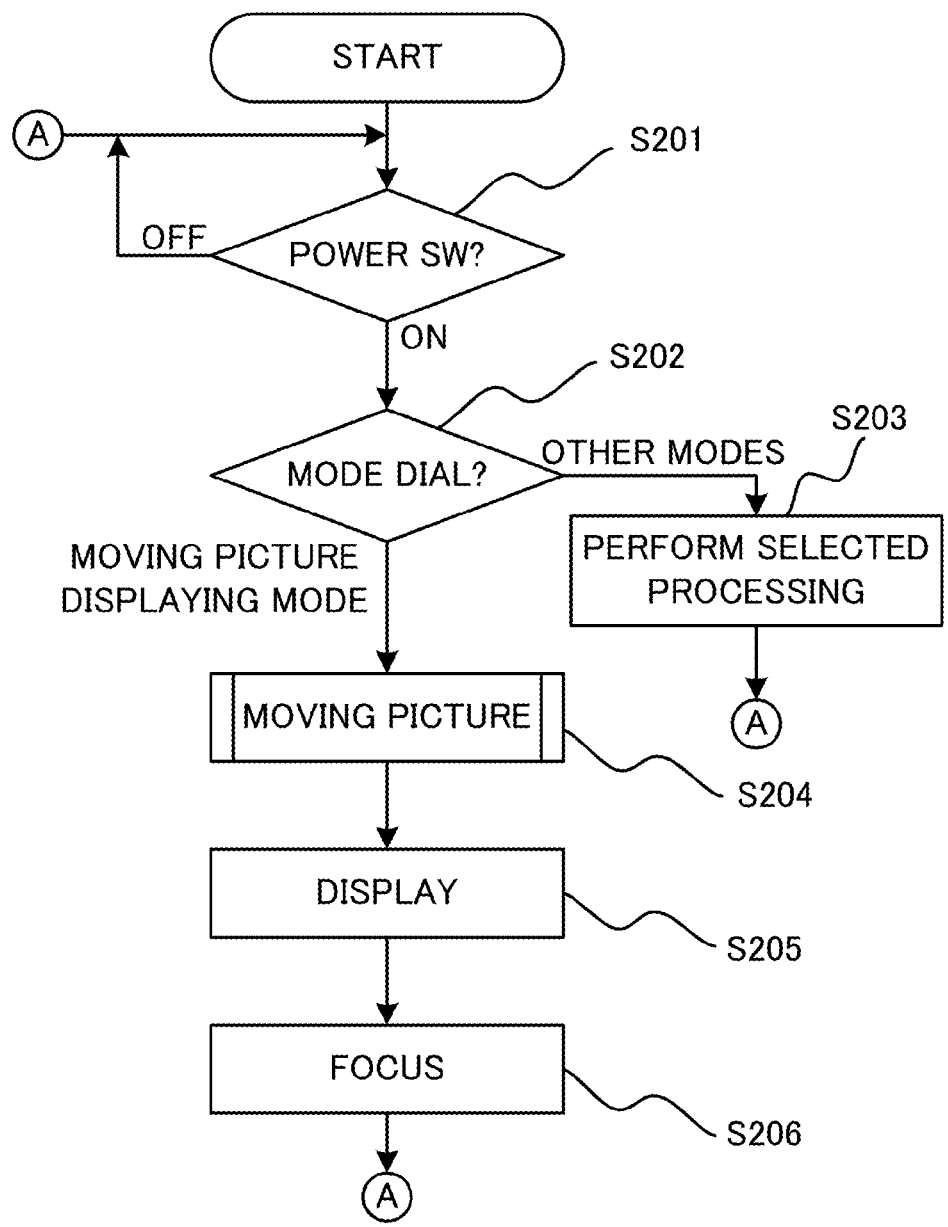
FIG. 6 is a flowchart of illustrating a moving picture displaying drive of the image pickup apparatus in Embodiment 1.

Next, referring to FIG. 6, a drive of an electronic view finder by the image pickup apparatus 100 will be described. FIG. 6 is a flowchart of illustrating an electronic view finder drive (a moving picture displaying drive). The moving picture displaying drive of the present embodiment is a drive that simultaneously performs the image shooting and the focus detection and that is performed in the addition mode (the addition readout mode) described with reference to FIGS. 3, 4A, 4B, and 5A to 5C. Each step illustrated in FIG. 6 is performed based on an instruction of the CPU 105 of the image pickup apparatus 100.

First of all, in Step S201 of FIG. 6, the CPU 105 determines whether or not the power switch 109 (the power SW) that runs the image pickup apparatus 100 is ON. When the power switch 109 is OFF, the CPU 105 stands by until the power switch 109 is turned on. On the other hand, when the power switch 109 is ON, the flow proceeds to Step S202. In Step S202, the CPU 105 determines whether or not the mode dial 112 is set to a moving picture displaying mode. When the mode dial 112 is set to the moving picture displaying mode, the flow proceeds to Step S204. On the other hand, when the mode dial 112 is set to any other mode, the flow proceeds to Step S203. In Step S203, the CPU 105 performs a processing in accordance with the selected mode (the selected processing), and then the flow returns to Step S201.

When the moving picture displaying mode is selected in Step S202, in Step S204, the CPU 105 performs a moving picture drive. The details of this moving picture drive will be described below. Subsequently, in Step S205, the CPU 105 displays an image obtained by the moving picture drive on a display unit such as a TFT (not shown). Subsequently, in Step S206, the CPU 105 performs a focus operation. In other words, the CPU 105 drives a lens (an image pickup lens), which is not shown, using ranging information calculated based on a pixel output of the focus detection pixel obtained during the moving picture drive. After the drive of the lens is completed, the flow returns to Step S201.

Figure 7:
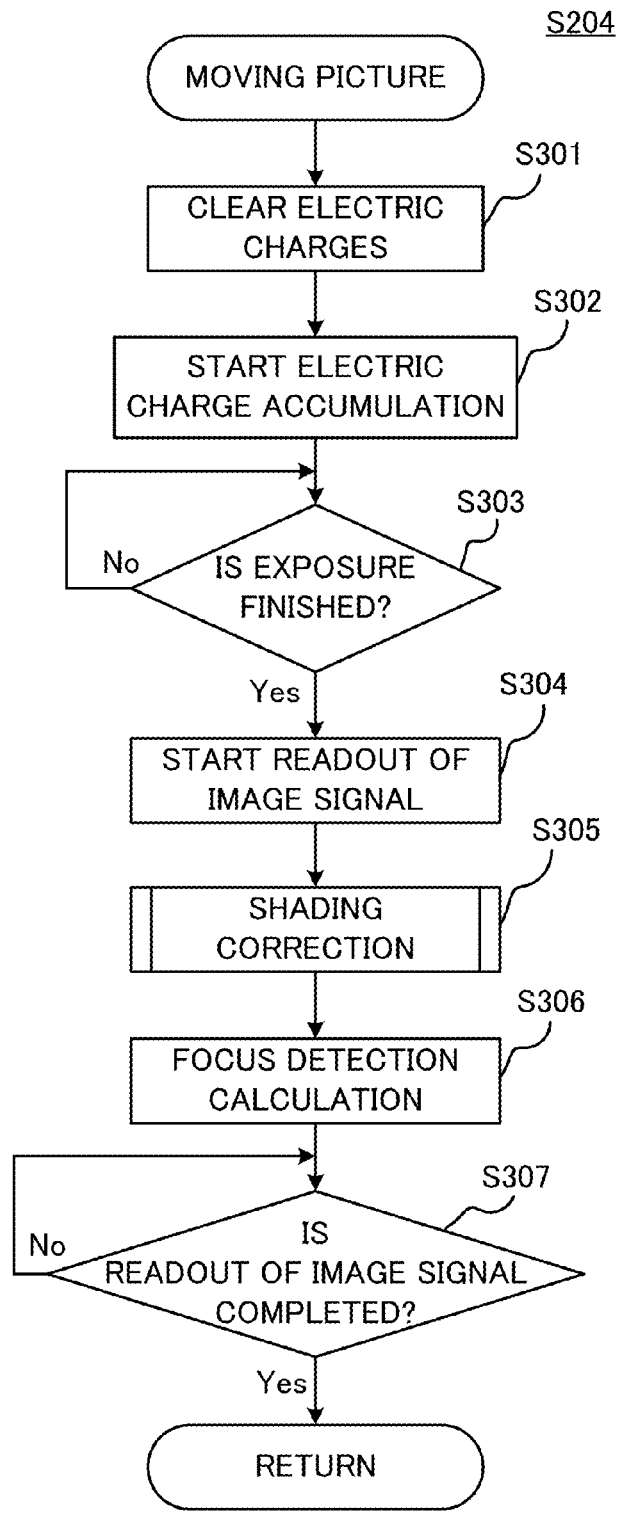
FIG. 7 is a flowchart of illustrating the moving picture drive of the image pickup apparatus in Embodiment 1.

Next, referring to FIG. 7, the detailed operation of the moving picture drive in Step S204 of FIG. 6 will be described. An actual sequence may be performed in parallel to each operation, but for convenience of descriptions, each operation is assumed to be a time-series operation. Each step of FIG. 7 is performed based on the instruction of the CPU 105.

First of all, in Step S301, an electric charge accumulated in the image pickup element 101 is removed (an electric charge clearing operation). Subsequently, in Step S302, the electric charge accumulation of the image pickup element 101 is started. After the electric charge accumulation is started, the flow proceeds to Step S303, and the CPU 105 determines whether or not the exposure is finished. When the exposure is not finished, the CPU 105 stands by until the exposure is finished. On the other hand, when the exposure is finished, the flow proceeds to Step S304. In Step S304, the CPU 105 starts the readout of an image signal of the image pickup element 101. When the image signal is read, using the drive mode described with reference to FIGS. 3, 4A, 4B, and 5A to 5C, the drive is performed so that the addition pixel output of the common pixels and the non-addition (thinned) pixel output are obtained. Furthermore, the CPU 105, at the same time as a start of the signal readout, performs the shading correction (a dark shading correction) in Step S305. The details of the dark shading correction will be described below.

Subsequently, in Step S306, the CPU 105 (the DSP 103) performs the phase difference focus detection (a focus detection calculation) based on the outputs of the focus detection pixels $S_{HA}$ and $S_{HB}$ for which the dark shading correction has been performed. In this case, the CPU 105 (the DSP 103), in parallel to a whole image processing, generates focus detection images (an A image and a B image) that are obtained by only selecting the outputs of the focus detection pixels $S_{HA}$ and $S_{HB}$ so as to perform a well-known phase difference focus detection. Subsequently, in Step S307, the CPU 105 determines whether or not the readout of the image signal from the image pickup element 101 is completed. When the readout of the image signal is not completed, it stands by until the readout of the image signal is completed. On the other hand, when the readout of the image signal from the image pickup element 101 is completed, a series of the processings of FIG. 7 is finished so as to return to the main processing (FIG. 6).

In the present embodiment, a one-dimensional dark shading correction in the horizontal direction of the image pickup element 101 is performed. In other words, in order to perform the calculation of correction data and the correction by the image itself at the time of shooting the image, a one-dimensional dark shading correction value in the horizontal direction is calculated based on the output of the VOB part (a vertical optical black part) of the image pickup element 101. Then, this calculation result is used as the correction data.

Figure 15:
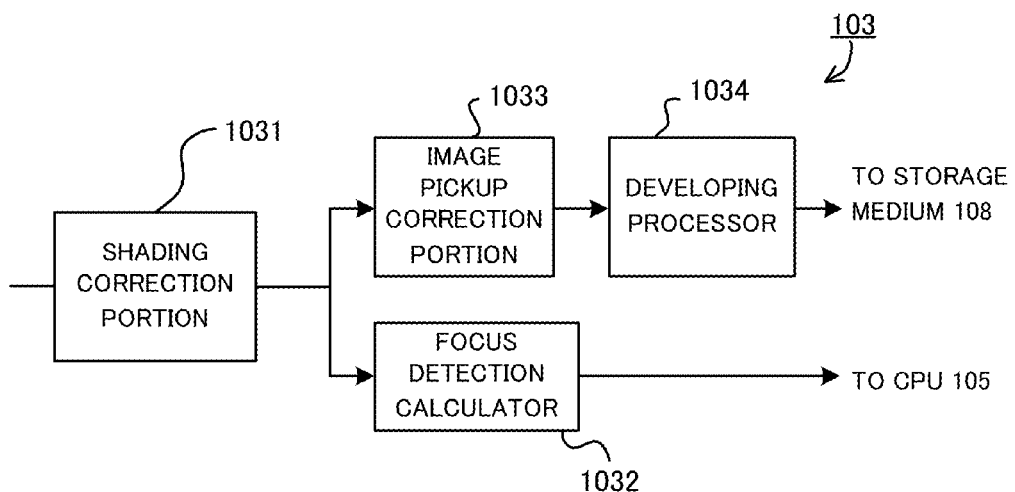
FIG. 15 is a block diagram of illustrating an operation of the DSP in Embodiment 1.

Next, referring to FIG. 15, the operation of the DSP 103 in the present embodiment will be described. FIG. 15 is a block diagram of illustrating the operation of the DSP 103. In FIG. 15, reference numeral 1031 denotes a shading correction portion that performs the shading correction for the image signal read from the image pickup element 101. Reference numeral 1032 denotes a focus detection calculator that collects only the outputs from the focus detection pixels after performing the shading correction so as to perform the focus detection calculation by the well-known phase difference method. The result calculated by the focus detection calculator 1032 is outputted to the CPU 105.

Reference numeral 1033 denotes an image pickup correction portion that performs various kinds of corrections such as a defect correction for the pixel outputs (the outputs of the image pickup pixel and the focus detection pixel) after the shading correction. Reference numeral 1034 denotes a developing processor that performs a developing processing of the image signal after various kinds of corrections are performed by the image pickup correction portion 1033. An output of the developing processor 1034 is written as image data in the storage medium 108. Since the defect correction of the focus detection pixel is performed by the image correction portion 1033, the deterioration of the image quality caused by the focus detection pixel can be reduced.

Figure 8:
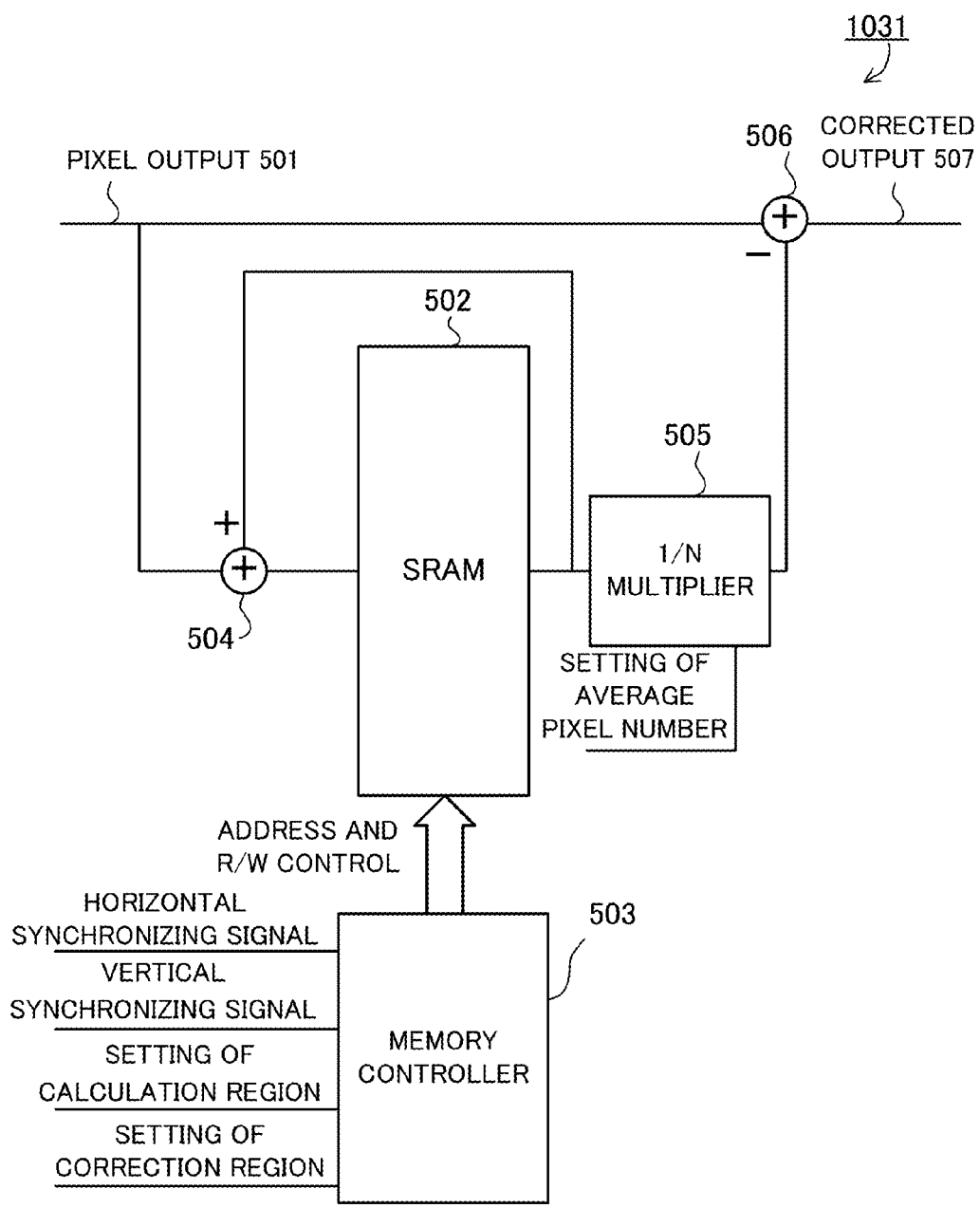
FIG. 8 is a circuit configuration diagram of a shading correction portion of a DSP in Embodiment 1.

Next, referring to FIG. 8, a circuit configuration of realizing the shading correction portion 1031 of the DSP 103 will be described. FIG. 8 is a circuit configuration diagram of the shading correction portion 1031. Reference numeral 501 denotes an input terminal of the shading correction portion 1031, and the digital signal (the pixel output) converted by the A/D converter 102 is inputted to the input terminal 501. Reference numeral 502 denotes an SRAM that stores a correction value corresponding to each column, which has a storage capacity more than or equal to the number of columns of the pixels of the image pickup element 101. In the present embodiment, since there are a plurality of drive modes, the SRAM 502 has the storage capacity more than or equal to the number of columns of the pixels of the image pickup element 101 for each mode.

Reference numeral 503 denotes a memory controller, which selects an address stored in the SRAM 502 in accordance with a timing of the pixel output that is to be calculated and corrected so as to read and write data (perform an R/W control of data). An operation of the memory controller 503 is performed in accordance with a setting of the calculation region and the correction region during the read timing of the image pickup element 101 using a horizontal synchronizing signal and a vertical synchronizing signal that controls the image pickup element 101 as reference timing.

Reference numeral 504 denotes an adder, which adds a current output value of the image pickup element 101 to the data stored in the address in the SRAM 502 corresponding to the output of the pixel which is currently read so as to perform an integral calculation for each column of the calculation region. Reference numeral 505 denotes a 1/N multiplier, which divides an integral result of all the pixels in the vertical direction for each column of the calculation region by the set average pixel number, i.e. the number of integral pixels stored in a specific address of the SRAM 502 so as to calculate an average value for each column. For simplifying the circuit, limiting the integral row number for each column to a power of two, it can be substituted by a bit shift.

Reference numeral 506 denotes a subtraction circuit that performs a subtraction processing for each pixel with respect to the output of the opening region of the image pickup element 101. The subtraction circuit 506 exactly subtracts horizontal shading correction data corresponding to each column that are outputted from the 1/N multiplier 505 in synchronization with the horizontal synchronizing signal with respect to the data outputted from the image pickup element 101. As a result, the output data of the shading correction portion 1031 of which an output of a dark part is substantially equal to zero and is flat in the horizontal direction are outputted as a corrected output from an output terminal 507. This corrected output is transferred to another block of the DSP 103.

Figure 9:
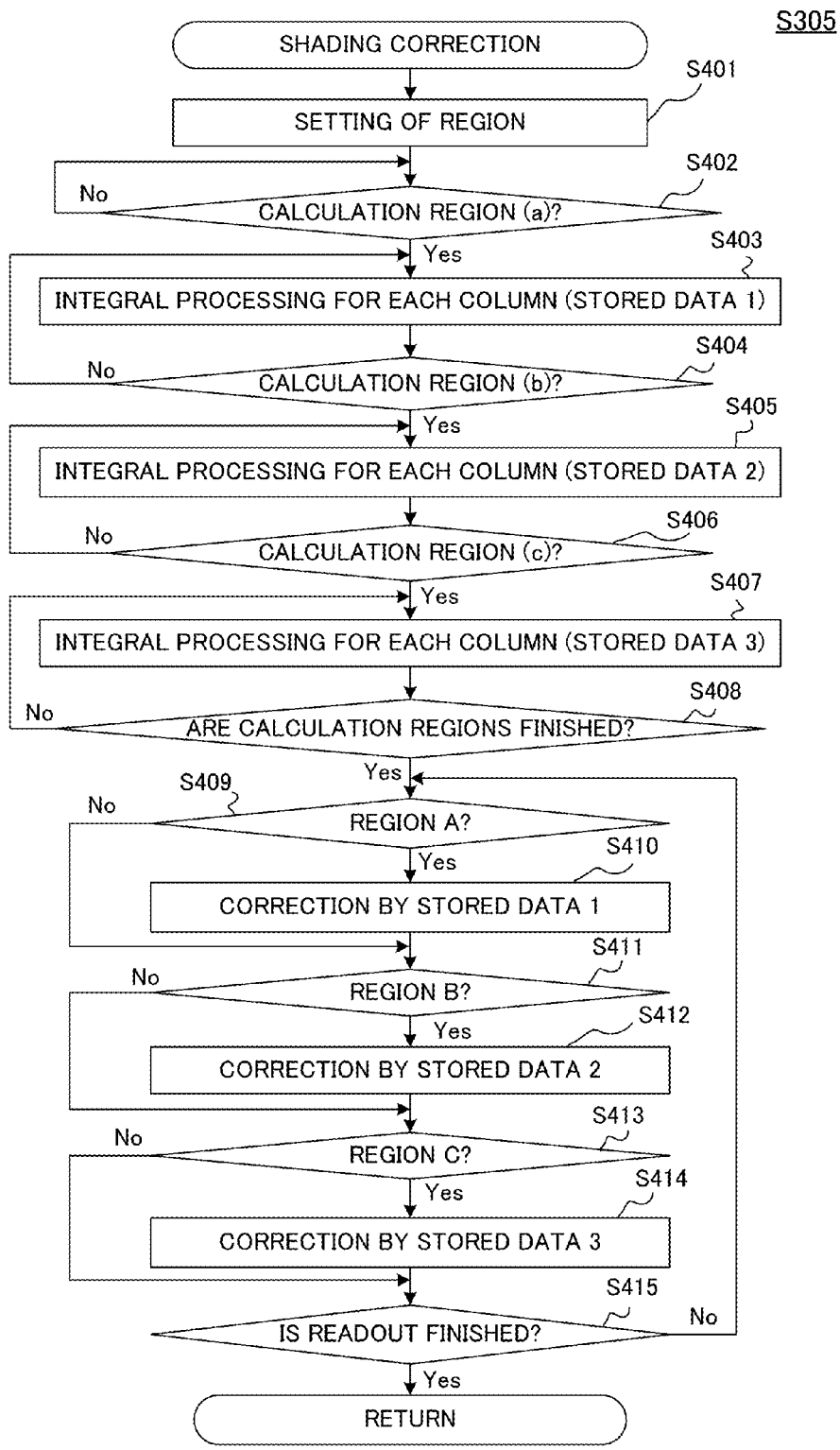
FIG. 9 is a flowchart of illustrating the shading correction in Embodiment 1.

Next, referring to FIG. 9, an operation of the shading correction portion 1031 will be described. FIG. 9 is a flowchart of illustrating the shading correction in Step S305 of FIG. 7. Actually, this flow starts at the same time as the start of the readout of the image signal in Step S304 of FIG. 7.

When Step S304 of FIG. 7 starts, in Step S401 of FIG. 9, all the contents stored in the SRAM 502 are reset before the image signal is read. Then, data such as a coordinate of the calculation region and the correction region that are to be set in each part are read from the ROM 106, the RAM 107, or the like so as to be set to each register (a region setting). After the region setting is completed, the readout of the image signal starts from the upper left of the image pickup element 101.

Subsequently, in Step S402, the shading correction portion 1031 determines whether or not the read pixel data (the image signal) are the image data of the calculation region (a) of FIG. 3. When the pixel data is the pixel data of the calculation region (a), in Step S403, the shading correction portion 1031 performs the integral processing for each column. In the integral processing, the addition processing is performed after the content of the address stored in the SRAM 502 that corresponds to a position in the horizontal direction of the read pixel data is read, and this addition result is stored as stored data 1 in the same address in the SRAM 502. The address in this case is a predetermined address that is used to store the data (the stored data 1) corresponding to a first drive pattern data. First of all, in a head row of the calculation region, a value to be added is "0" since it is in a state where the content of the SRAM 502 is reset, and the read pixel data are stored in the SRAM 502 as they are. Thus, when the readout of the pixel data in the head row of the calculation region is completed, the data in the head row are stored in the SRAM 502 as they are.

Subsequently, in Step S404, the shading correction portion 1031 determines whether or not the read pixel data are the pixel data of the calculation region (b) of FIG. 3. When the pixel data are not the pixel data of the calculation region (b), the flow returns to Step S403 and pixel data in a next row in the calculation region (a) are read. Similarly to the case of the head row, a value stored in the SRAM 502 of the address corresponding to a read position in the horizontal direction is read so as to add the read pixel data, and the addition result is stored in the SRAM 502 again. Repeating similarly, at the stage of moving to the calculation region (b) in Step S404, the readout of the calculation region (a) is finished. In this case, the addition result of the pixel outputs of all the rows for each column of the calculation region (a) is stored in the address stored in the SRAM 502.

On the other hand, when the pixel data read in Step S404 are the pixel data of the calculation region (b) in FIG. 3, the flow proceeds to Step S405, and similarly to Step S403, the integral processing is performed for each column and the result is stored as stored data 2. In this case, the address in the SRAM 502 is a predetermined address that is used to store data (the stored data 2) corresponding to second drive pattern data.

Subsequently, in Step S406, the shading correction portion 1031 determines whether or not the read pixel data are the pixel data of the calculation region (c) of FIG. 3. When the pixel data are not the pixel data of the calculation region (c), the flow returns to Step S405 and pixel data in the next row in the calculation region (b) are read. Similarly to the case of the previous row, a value stored in the SRAM 502 of the address that corresponds to a read position in the horizontal direction is read so as to add the read pixel data, and then the addition result is stored in the SRAM 502 again. Repeating similarly, at the stage of moving to the calculation region (c) in Step S406, the readout of the calculation region (b) is finished. In this case, the addition result of the pixel outputs of all the rows for each column of the calculation region (b) is stored in the address stored in the SRAM 502.

On the other hand, when it is determined that the pixel data read in Step S406 are the pixel data of the calculation region (c) in FIG. 3, the flow proceeds to Step S407. In Step S407, similarly to Step S403 or S405, the integral processing is performed for each column and the result is stored as stored data 3. In this case, the address in the SRAM 502 is a predetermined address that is used to store data (the stored data 3) corresponding to third drive pattern data.

Subsequently, in Step S408, the shading correction portion 1031 determines whether or not the readout of the pixel data of the calculation regions is finished. When the readout of the pixel data in the calculation region is not finished, the flow returns to Step S407 and pixel data of the next row in the calculation region (c) are read. Similarly to the pixel data of the previous row, a value stored in the SRAM 502 of the address that corresponds to a read position in the horizontal direction is read so as to add the read pixel data, and then the addition result is stored in the SRAM 502 again. Repeating similarly, at the stage of finishing the calculation regions in Step S408, the readout of the calculation region (c) is finished, and the addition result of the pixel outputs of all the rows for each column of the calculation region (c) is stored in the address stored in the SRAM 502.

On the other hand, in Step S408, when the readout of the pixel data of the calculation regions is finished, the flow proceeds to Step S409, and the shading correction portion 1031 determines whether or not it is a readout of the pixel data in a region A of the opening region (a). When it is the readout of the pixel data in the region A, the flow proceeds to Step S410. In Step S410, the shading correction portion 1031 reads the data (the stored data 1) stored in the SRAM 502 of the address that corresponds to the position in the horizontal direction of each pixel data read in Step S403. Then, the 1/N multiplier 505 converts them into an average value for each column, and the subtraction circuit 506 performs the subtraction processing. The shading correction portion 1031 outputs the result as a corrected output. Thus, the shading correction portion 1031 corrects the pixel data of the region A using the stored data 1.

On the other hand, when the readout is not the readout of the pixel data of the region A in Step S409, in Step S411, it is determined whether or not the readout is a readout of the pixel data in a region B of the opening region (b). When it is the readout of the pixel data of the region B, the flow proceeds to Step S412, and the data (the stored data 2) stored in the SRAM 502 of the address that corresponds to the position in the horizontal direction of each pixel data read in Step S405 are read. Then, the 1/N multiplier 505 converts them into an average value for each column, and the subtraction circuit 506 performs the subtraction processing. The shading correction portion 1031 outputs the result as a corrected output. Thus, the shading correction portion 1031 corrects the pixel data of the region B using the stored data 2.

On the other hand, when the readout is not the readout of the pixel data of the region B in Step S411, in Step S413, it is determined whether or not the readout is a readout of the pixel data in a region C of the opening region (b). When it is the readout of the pixel data of the region C, the flow proceeds to Step S414, and the data (the stored data 3) stored in the SRAM 502 of the address that corresponds to the position in the horizontal direction of each pixel data read in Step S407 are read. Then, the 1/N multiplier 505 converts them into an average value for each column, and the subtraction circuit 506 performs the subtraction processing. The shading correction portion 1031 outputs the result as a corrected output. Thus, the shading correction portion 1031 corrects the pixel data of the region C using the stored data 3.

On the other hand, when it is not the readout of the pixel data of the region C in Step S413, in Step S415, it is determined whether or not the readout of the pixel data is finished. As a result of this determination, when the readout of the pixel data is not finished, the flow returns to Step S409. In other words, since the readout of the calculation region is finished, as long as the read pixel data are the correction region, a correction of using any one of the stored data 1 to 3 is repeatedly performed. Then, as a result of the determination in Step S415, when the readout of the pixel data is finished, the shading correction processing of FIG. 9 is finished. According to the shading correction processing (a signal processing method) of the present embodiment, a variation of the average value for each column that is generated in accordance with a difference of the drive mode in the calculation region in the VOB part can be effectively corrected.

Thus, the image pickup element 101 of the present embodiment includes the reference region (the calculation region) that is a light-shielded region and the opening region. The reference region includes a part of each of the plurality of image pickup pixels and the plurality of focus detection pixels. The DSP 103, in the reference region, calculates first correction data (the stored data 1) for the signal (a first pixel signal) from the image pickup pixel and second correction data (the stored data 2) for the signal (a second pixel signal) from the focus detection pixel. Then, the DSP 103 performs the shading correction for the first pixel signal from the opening region using the first correction data, and for the second pixel signal from the opening region using the second correction data. The focus detection calculator 1032 performs the focus detection using the signal that is obtained by performing the shading correction for the second pixel signal.

Figure 10A:
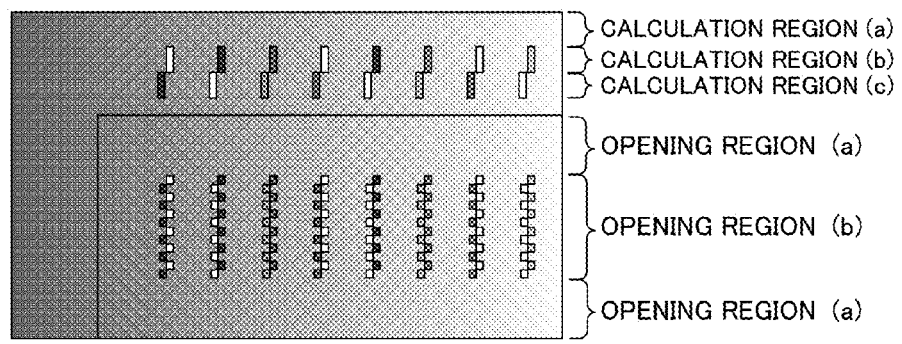
FIGS. 10A to 10C are diagrams of illustrating image outputs (image outputs before and after the correction) of the image pickup element in Embodiment 1.
Figure 10B:
Figure 10B:
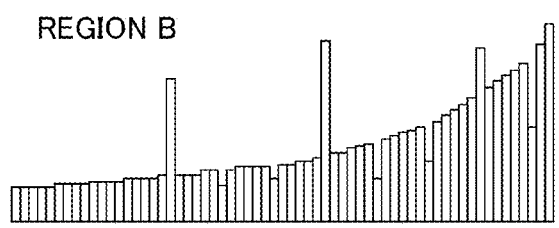
Figure 10B:
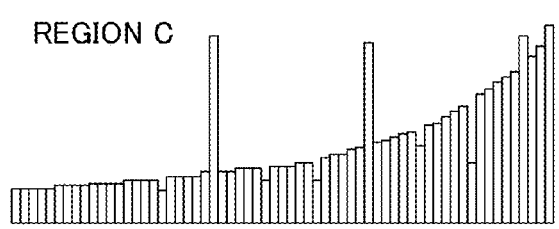
Figure 10C:
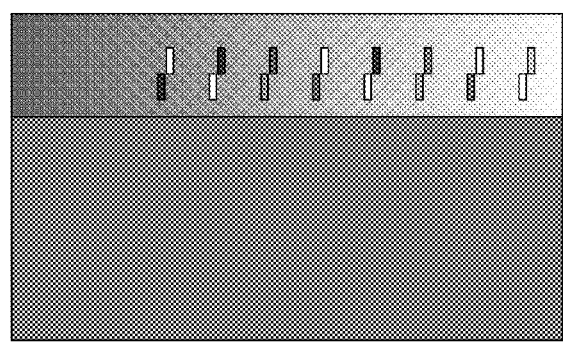

Next, referring to FIGS. 10A to 10C, an effect of the shading correction processing in the present embodiment will be described. FIGS. 10A to 10C are diagrams of describing the effect of the shading correction processing, and FIG. 10A illustrates an image output in a dark (in a dark situation) before performing the shading correction, FIG. 10B illustrates shading images of the regions A, B, and C, and FIG. 10C illustrates an image output in the dark situation after performing the shading correction.

Figure 11:
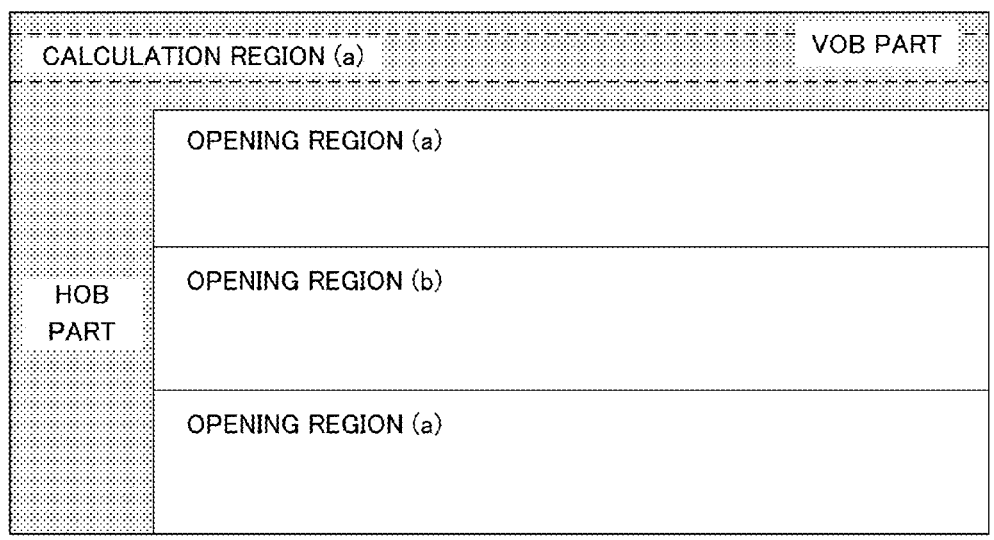
FIG. 11 is a pixel arrangement diagram of an image pickup element in Embodiment 2.

The image output illustrated in FIG. 10A corresponds to the pixel arrangement of FIG. 11, which is provided with the calculation regions (a) to (c) and the opening regions (a) and (b). The image output illustrated in FIG. 10A contains a shading in the horizontal direction. Therefore, the correction data (the shading correction value) in the horizontal direction are calculated in the calculation regions (a) to (c) in the VOB part. FIG. 10B is data calculated in the calculation regions (a) to (c), which are used as shading correction data of the regions A, B, and C, respectively.

When the shading correction processing is performed for the image output illustrated in FIG. 10A using the shading correction data of FIG. 10B, the image data illustrated in FIG. 10C can be obtained. In other words, the subtraction processing is performed in the opening regions (a) and (b) that are the correction region using the correction data obtained in the calculation regions (a) to (c), and thus a flat image output where the shading in the horizontal direction in the correction region has been corrected can be obtained.

The image pickup apparatus of the present embodiment operates in a drive mode having a plurality of patterns in one frame, and includes a region (the calculation region (a)) that is driven by a first drive pattern and regions (the calculation regions (b) and (c)) that are driven by second and third drive patterns, respectively, in a vertical reference region (the VOB part) of the image pickup element. It obtains data used to perform the shading correction so as to correct data of correction regions (the opening regions). As a result, even when the correction regions (the opening regions) are operated in drive modes different from each other, an appropriate shading correction is performed and therefore the deterioration of the image quality can be prevented.

[Embodiment 2]

Next, an image pickup apparatus in Embodiment 2 of the present invention will be described. The image pickup apparatus of Embodiment 1 includes a region that is driven by a plurality of drive modes in the vertical reference region (the VOB part). In such a configuration, it obtains correction data that correspond to each of the plurality of drive modes. However, when the configuration as described in Embodiment 1 is adopted, in the SRAM 502, at least a region where data for each drive mode corresponding to each row are stored needs to be ensured. Therefore, a memory region is increased. On the other hand, the present embodiment provides an image pickup apparatus that reduces the deterioration of the image quality in a small memory region.

The image pickup apparatus of the present embodiment includes correction data that are obtained by a first drive pattern (or it obtains the correction data as described in Embodiment 1), and previously includes difference data from the data obtained by the first drive pattern with respect to each of regions that are driven by second and third drive patterns. A basic configuration of the image pickup apparatus in the present embodiment is the same as that of the image pickup apparatus in Embodiment 1.

First of all, referring to FIG. 11, a pixel arrangement of the image pickup element 101 of the present embodiment will be described. FIG. 11 is a pixel arrangement diagram of the image pickup element 101. In the pixel arrangement illustrated in FIG. 11, only a region (a calculation region (a)) that is driven by the first drive pattern used for the row where only common pixels (image pickup pixels) exist is provided in the VOB part (the vertical optical black region). Other configurations are the same as those of the pixel arrangement in Embodiment 1 described with reference to FIG. 3, and therefore the detailed descriptions are omitted. According to the configuration of the present embodiment, providing only the calculation region (a) that is driven by the first drive pattern in the VOB part, a chip area can also be reduced compared to the image pickup element of Embodiment 1.

Figure 16:
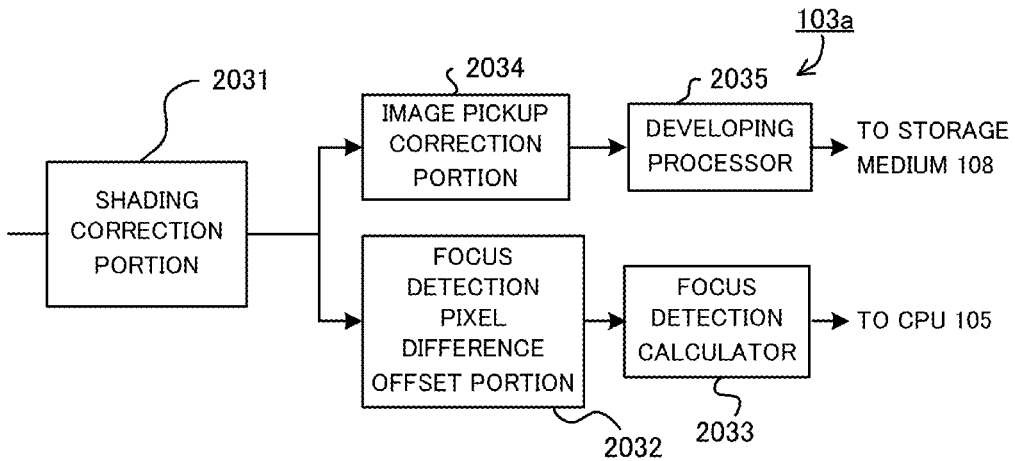
FIG. 16 is a block diagram of illustrating an operation of the DSP in Embodiment 2.

Next, referring to FIG. 16, an operation of a DSP 103a in the present embodiment will be described. FIG. 16 is a block diagram of illustrating the operation of the DSP 103a. In FIG. 16, reference numeral 2031 denotes a shading correction portion (a first shading correction portion) that performs a shading correction for an image signal read from the image pickup element 101. A basic operation of the shading correction portion 2031 is the same as that of the shading correction portion 1031 in FIG. 15. However, in the present embodiment, a region that is used to obtain correction data is only the calculation region (a) as illustrated in FIG. 11. The shading correction portion 2031 performs the shading correction, and then outputs signals of the focus detection pixel and the common pixel (the image pickup pixel) in parallel to each other.

Reference numeral 2032 denotes a focus detection pixel difference offset portion (a second shading correction portion). The focus detection pixel difference offset portion 2032 collects only outputs from the focus detection pixels after the shading correction portion 2031 performs the shading correction. Then, it treats difference data between the common pixel and the focus detection pixel that are generated by the correction of the shading correction portion 2031 as an offset amount so as to obtain a corrected image. In the present embodiment, the difference data are previously stored in the ROM 106. Reference numeral 2033 denotes a focus detection calculator that performs a focus detection calculation by a phase difference method using an output of the focus detection pixel for which the shading (the offset) has been corrected via the focus detection pixel difference offset portion 2032. A result calculated by the focus detection calculator 2033 is outputted to the CPU 105.

Reference numeral 2034 denotes an image pickup correction portion that performs various kinds of corrections such as a defect correction for the pixel outputs (the outputs of the image pickup pixel and the focus detection pixel) for which the shading correction has been performed. Reference numeral 2035 denotes a developing processor that performs a developing processing of the image signal after the various kinds of corrections are performed by the image pickup correction portion 2034. An output of the developing processor 2035 is written as image data in the storage medium 108. Since the defect correction of the focus detection pixel is performed by the image correction portion 2034, the deterioration of the image quality caused by the focus detection pixel can be reduced.

Figure 12A:
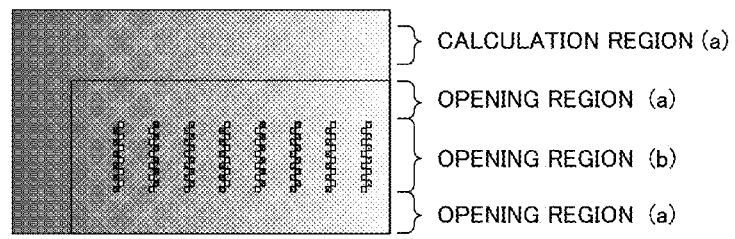
FIGS. 12A to 12E are diagrams of illustrating image outputs (image outputs before and after the correction) of the image pickup element in Embodiment 2.
Figure 12B:
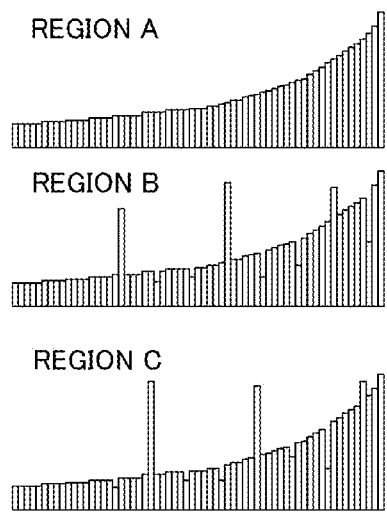
Figure 12D:
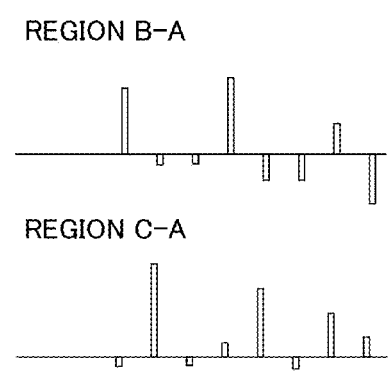
Figure 12E:
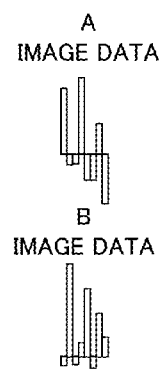
Figure 12C:
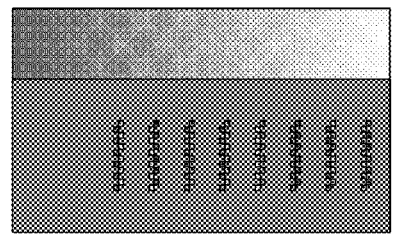

Next, referring to FIGS. 12A to 12E, an effect of the shading correction processing in the present embodiment will be described. FIGS. 12A to 12E are diagrams of describing the effect of the shading correction processing. FIG. 12A illustrates an image output in the dark situation before performing the shading correction, FIG. 12B illustrates shading images of the regions A, B, and C, and FIG. 12C illustrates an image output in the dark situation after performing the shading correction. FIG. 12D illustrates a difference of the shading between the region B and the region A (a region B-A), and a difference of the shading between the region C and the region A (a region C-A). FIG. 12E illustrates A image data and B image data that are obtained as difference data.

As illustrated in FIG. 12A, with respect to an image output that contains the shading in the horizontal direction, a correction value in the horizontal direction is calculated in the calculation region (a) in the VOB part. In FIG. 12B, the shading of the region A is equivalent to the calculation result in the calculation region (a). Data of the region A are used as image shading correction data of the opening regions (the regions A, B, and C).

FIG. 12C is an image that is obtained by performing the subtraction processing for the opening portion using the shading data of the region A (the calculation result of the calculation region (a)) and performing the correction processing. As illustrated in FIG. 12C, the shading in the horizontal direction of the region A is corrected in all the opening regions (the correction regions), and therefore an output as a flat dark image can be performed with regard to the region where the same operation as that of the first drive pattern (the adding operation). However, with regard to the outputs of the focus detection pixels in the regions B and C, remaining amounts of the correction of the shading are generated. With regard to the remaining amount of the correction of the shading, as described with reference to FIGS. 5A to 5C, it does not influence on the deterioration of the image quality since the correction is performed by treating the focus detection pixel as the defect pixel at the subsequent stage.

FIG. 12D illustrates remaining amounts of the corrections that are generated in the regions B and C when the shading correction is performed by using the shading data of the region A (the calculation result of the calculation region (a)). FIG. 12E illustrates images (A image data and B image data) that are obtained by collecting the difference data of positions corresponding to the non-addition pixels (the focus detection pixels) in the regions B-A and C-A in FIG. 12D. As described below, the A image data of FIG. 12E is used as a correction value only for the focus detection pixel $S_{HA}$ of the region B, and the B image data of FIG. 12E is used as a correction value only for the focus detection pixel $S_{HB}$ of the region C.

In the present embodiment, the A image data of FIG. 12E is previously stored in the ROM 106 as correction data (stored data 21) for a focus detection image A (the A image) that are formed by collecting the focus detection pixels $S_{HA}$. Furthermore, the B image data of FIG. 12E is previously stored in the ROM 106 as correction data (stored data 22) for a focus detection image B (the B image) that are formed by collecting the focus detection pixels $S_{HB}$. In the present embodiment, also for the regions B and C, the data of the region that operate by the same drive as that for the region A are removed, and therefore an amount of data can be reduced.

Figure 13:
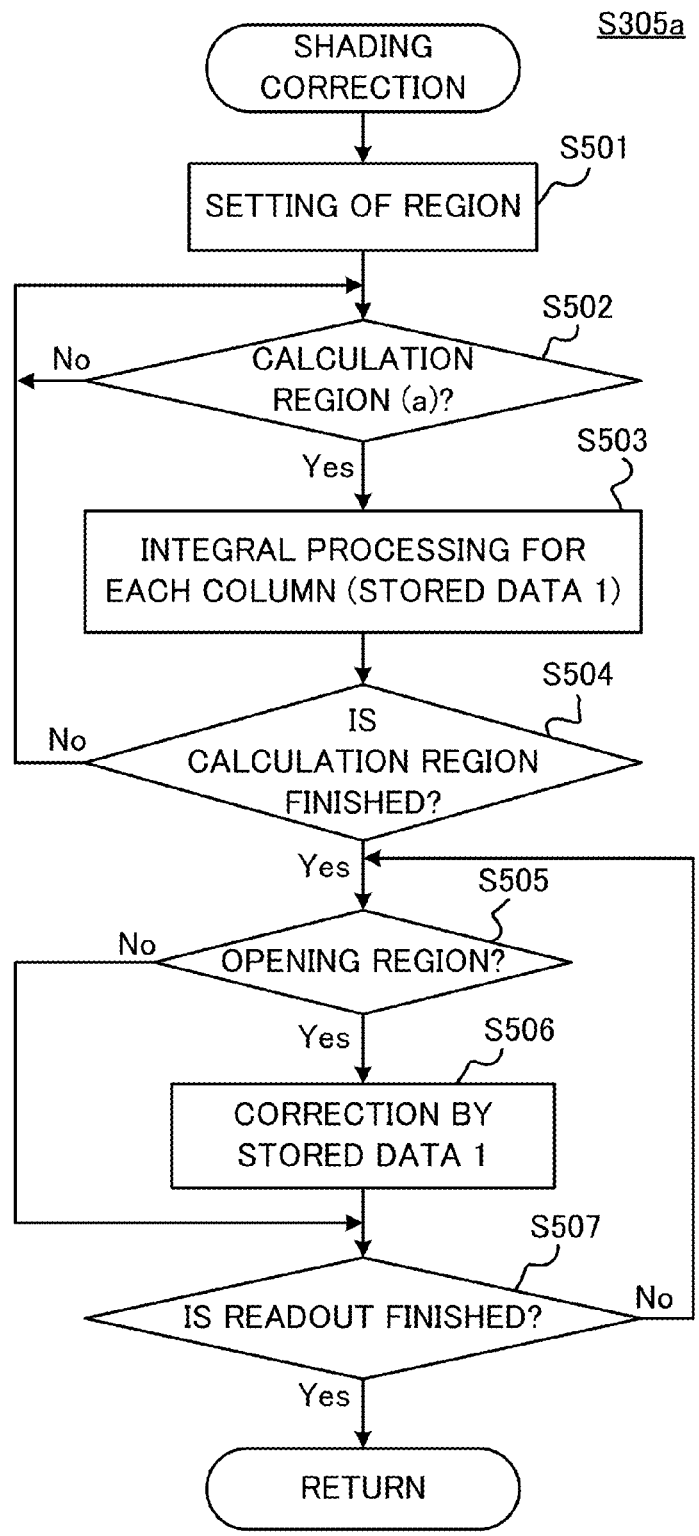
FIG. 13 is a flowchart of illustrating a shading correction in Embodiment 2.

The operation of the present embodiment is the same as the sequence described with reference to FIGS. 6 and 7 except for Step S305 of FIG. 7. Therefore, with respect to Step S305a that corresponds to Step S305 of FIG. 7, referring to FIG. 13, the shading correction of the present embodiment will be described. FIG. 13 is a flowchart of the shading correction in the present embodiment. An operation sequence of FIG. 13 actually starts at the same time as the readout of the image pickup signal in Step S304 of FIG. 7.

First of all, in Step S304 of FIG. 7, the readout of the image pickup element 101 is started. At the same time, in Step S501 of FIG. 13, all the contents stored in the SRAM 502 are reset before the readout of the image pickup element 101 is performed. In addition, data such as coordinates of the calculation region and the correction region that are to be set in each portion are read from the ROM 106, the RAM 107, and the like to be set to each register. Then, the readout starts from the upper left of the image pickup element 101.

Subsequently, in Step S502, the shading correction portion 2031 determines whether or not the read pixel data are the data of the calculation region (a) in FIG. 11. When the read data are the data of the calculation region (a), in Step S503, the integral processing is performed for each column. In the integral processing, the addition processing is performed after the content of the address stored in the SRAM 502 that corresponds to a position in the horizontal direction of the read pixel data, and this addition result is stored in the same address in the SRAM 502 again. The address in this case is a predetermined address that is used to store the data (the stored data 1) corresponding to the first drive pattern data.

First of all, in a head row of the calculation region, a value to be added is "0" since it is in a state where the content of the SRAM 502 is reset, and the read pixel data are stored in the SRAM 502 as they are. Thus, when the readout of the pixel data in the head row of the calculation region is completed, the data in the head row are stored in the SRAM 502 as they are.

Subsequently, in Step S504, the shading correction portion 2031 determines whether or not the readout of the pixel data in the calculation region is finished. When the readout of the pixel data of the calculation region is not finished, the flow returns to Step S502, and the pixel data in the next row in the calculation region (a) are read. Similarly to the pixel data in the head row, a value stored in the SRAM 502 of the address corresponding to a read position in the horizontal direction is read so as to add the read pixel data to this value, and the addition result is stored in the SRAM 502. Repeating similarly, at the stage of finishing the calculation region in Step S504, the readout of the calculation region (a) is finished. In this case, the addition result of the pixel outputs of all the rows for each column of the calculation region (a) is stored in the address stored in the SRAM 502.

On the other hand, in Step S504, when the readout of the pixel data of the calculation region is not finished, the flow proceeds to Step S505, and the shading correction portion 2031 determines whether or not it is the readout of the pixel data of the opening region (the correction region). When it is the readout of the opening region, the flow proceeds to Step S506, and the shading correction portion 2031 reads the data (the stored data 1) stored in the SRAM 502 of the address that corresponds to the position in the horizontal direction of each pixel data read in Step S503. Then, the 1/N multiplier 505 converts them into an average value for each column, and the subtraction circuit 506 performs the subtraction processing. The signal obtained like this is outputted as a corrected output from the output terminal 507.

On the other hand, in Step S505, when it is not the readout of the pixel data of the opening region, the flow proceeds to Step S507, and the shading correction portion 2031 determines whether or not the readout of the pixel data is finished. When the readout of the pixel data is not finished, the flow returns to Step S505. In other words, since the readout of the calculation region is finished, as long as the read pixel data are the opening region (the correction region), a correction of using the stored data 1 is repeatedly performed. On the other hand, when the readout of the pixel data is finished in Step S507, the shading correction processing is finished.

In the present embodiment, all the regions A to C of the opening regions are corrected by the correction data (the stored data 1) using the first drive pattern. Therefore, at the stage where the shading correction described with reference to FIG. 13 has been finished, as illustrated in FIG. 12C, the correction for a part where the drive pattern is different in the regions B and C, i.e. specifically outputs of the focus detection pixels $S_{HA}$ and $S_{HB}$ that are the non-addition pixel is insufficient. However, with regard to an image generation, as described with reference to FIGS. 5A to 5C, it does not influence on the deterioration of the image quality since the well-known correction is performed for the focus detection pixel as a defect pixel.

On the other hand, when proceeding to Step S306 of FIG. 7, the focus detection images (the A and B images) formed by collecting the outputs of the focus detection pixels are generated based on the image for which the shading correction of FIG. 13 has been performed. In Step S306 of FIG. 7, for the generated focus detection images (the A and B images), the difference processing is performed using the shading difference data previously stored as described with reference to FIGS. 12A to 12E (the stored data 21 and 22), respectively. Then, the phase difference focus detection calculation is performed.

Figure 14A:
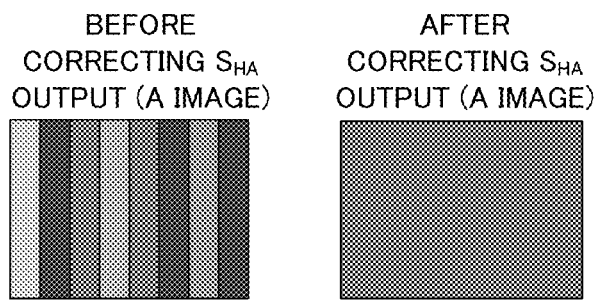
FIGS. 14A and 14B are diagrams of illustrating outputs of focus detection images (image outputs before and after the correction) in a dark situation in Embodiment 2.
Figure 14B:
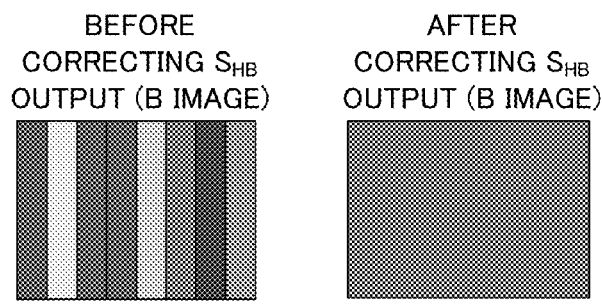

Next, referring to FIGS. 14A and 14B, the output of the focus detection image in the dark situation in the present embodiment will be described. FIGS. 14A and 14B illustrate the outputs of the focus detection images in the dark situation. FIG. 14A is a focus detection image A (an A image) that is obtained by collecting the focus detection pixels $S_{HA}$, and at the left side, an image output that is obtained after the shading correction in the region A is performed and before the correction (the subtraction processing) using the shading difference data (the stored data 21) is performed is illustrated. At the right side in FIG. 14A, an image output that is obtained after the correction (the subtraction processing) using the shading difference data (the stored data 21) is performed is illustrated. Similarly, FIG. 14B is a focus detection image B (a B image) that is obtained by collecting the focus detection pixels $S_{HB}$, and at the left side, an image output that is obtained after the shading correction in the region A is performed and before the correction (the subtraction processing) using the shading difference data (the stored data 22) is performed is illustrated. At the right side in FIG. 14B, an image output that is obtained after the correction (the subtraction processing) using the shading difference data (the stored data 22) is performed is illustrated. As a result, the shading of the focus detection images (the A and B images) can also be in a flat state.

Thus, the image pickup element 101 of the present embodiment includes the light-shielded reference region (the calculation region) and the opening region, and the reference region includes only a part of the plurality of image pickup pixels. The DSP 103a (the signal processor) calculates the first correction data (the stored data 1) with respect to the signal (the first pixel signal) from the image pickup pixel in the reference region. Then, the shading correction portion 2031 of (the first shading correction portion) of the DSP 103a performs the shading correction for the first pixel signal and the second pixel signal from the opening region using the first correction data. In addition, the focus detection pixel difference offset portion 2032 (the second shading correction portion) of the DSP 103a corrects the remaining amount of the shading correction with respect to the signal (the second pixel signal) from the focus detection pixel using the previously stored difference data (the stored data 21 and 22). Performing the correction processing described above, the variation of the average value for each column that is generated in accordance with the difference of the drive mode that exists in the calculation region in the VOB part can be corrected.

According to the present embodiment, the configuration of the reference region (the VOB part) is simplified, and furthermore the pixel data obtained from the common pixel (the image pickup pixel) and the focus detection pixel can be appropriately corrected while the memory region such as an SRAM is reduced. In the present embodiment, since the case where the arrangement of the focus detection pixels is different in accordance with the row is described, three kinds of drive patterns of the first to third drive patterns are used, but the present embodiment is not limited to this. For example, when the image pickup element is configured so that the focus detection pixels $S_{HA}$ and $S_{HB}$ are arranged in the same row, two kinds of drive patterns of the first drive pattern that is used for the common pixel and the second drive pattern that is used for a case where the focus detection pixel is included are used as the drive pattern. Even in this case, according to the present embodiment, an appropriate correction can be performed. In the present embodiment, as the case where the drive pattern different from the drive pattern for the common pixel is used, the focus detection pixel is described as an example, but the present embodiment is not limited to this. For example, the present embodiment is also effective when a plurality of patterns are included in one frame due to the existence of a special pixel that is used for temperature detection or the like.

[Embodiment 3]

Next, an image pickup apparatus in Embodiment 3 of the present invention will be described. In Embodiments 1 and 2, similarly to the shading for the common pixel, the correction for the focus detection pixel is also performed in the horizontal direction in one dimension. As a result, the shading (the offset) is substantially constant in a whole of the screen, but closely seeing it by one pixel unit, an offset shift slightly remains due to a characteristic shift for each pixel. In view of performing the focus detection, it is desirable to improve the accuracy so that a slight shift (offset shift) of one pixel unit can also be reduced. In the present embodiment, the shading corrections (the offset corrections) for the common pixel and the focus detection pixel are separately performed so as to especially improve a correction performance of the focus detection pixel for one pixel. A configuration and an operation of the image pickup apparatus in the present embodiment is basically the same as that of Embodiment 2, and therefore descriptions relating to them are omitted.

Figure 17:
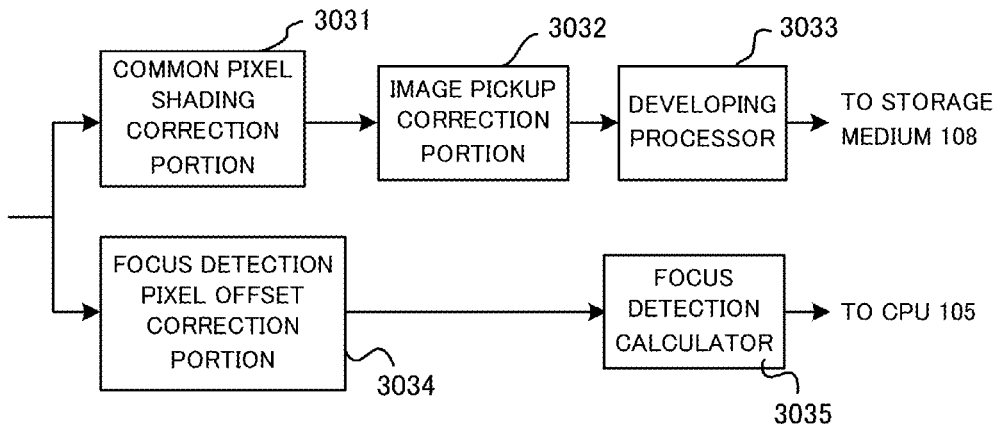
FIG. 17 is a block diagram of illustrating an operation of the DSP in Embodiment 3.

Referring to FIG. 17, an operation of a DSP 103b in the present embodiment will be described. FIG. 17 is a block diagram of illustrating the operation of the DSP 103b. The DSP 103b separates an image into an image output of a whole image (the common pixels and the focus detection pixels) and an image output of only the focus detection pixels at a stage where the image is inputted into the DSP 103b. Then, the DSP 103b performs a parallel processing for these image outputs. Specifically, for the pixel output (the image output) of all the pixels (the common pixels and the focus detection pixels), an image generation processing is performed by a common pixel shading correction portion 3031 (a first shading correction portion), an image pickup correction portion 3032, and a developing processor 3033. On the other hand, for the image output from only the focus detection pixels, a focus detection processing is performed by a focus detection pixel offset correction portion 3034 (a second shading correction portion) and a focus detection calculator 3035.

Reference numeral 3031 denotes the common pixel shading correction portion that performs the shading correction for a signal read from the image pickup element 101. A basic operation of the common pixel shading correction portion 3031 is the same as that of the shading correction portion 2031 of FIG. 16. Reference numeral 3032 denotes the image pickup correction portion that performs various kinds of corrections such as the defect correction for the image output (the outputs of the common pixels and the focus detection pixels) obtained after the shading correction. The image pickup correction portion 3032 performs the defect correction of the focus detection pixel so as to prevent the deterioration of the image quality caused by the focus detection pixel. Reference numeral 3033 denotes the developing processor that performs a developing processing after the correction is performed by the image pickup correction portion 3032. The output of the developing processor 3033 is written into the storage medium 108.

Reference numeral 3034 denotes the focus detection pixel offset correction portion that selectively inputs only the focus detection pixels that exist at predetermined coordinates and that reads offset data of pixel unit of the focus detection pixels previously stored in the ROM 106 so as to perform a correction processing using the offset data. Thus, the offset (the shading) of each pixel can be corrected, and compared to the correction for each column as described in Embodiment 1 or 2, the output of the focus detection pixel can be obtained with high accuracy. Reference numeral 3035 denotes the focus detection calculator that performs a well-known phase difference focus detection calculation using the output of the focus detection pixel for which the offset correction has been performed by the focus detection pixel offset correction portion 3034. A result obtained by the focus detection calculator 3035 is outputted to the CPU 105.

Figure 18:
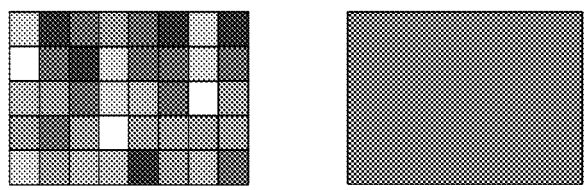
FIG. 18 is a diagram of illustrating outputs of focus detection images (image outputs before and after the correction) in a dark situation in Embodiment 3.

Next, referring to FIG. 18, an output of the focus detection image in the dark situation in the present embodiment will be described. FIG. 18 illustrates the output of the focus detection image in the dark situation. The left side in FIG. 18 is a focus detection image (an A image) that is obtained by collecting the focus detection pixels $S_{HA}$, which is an image output before the correction (the subtraction processing) is performed. This image output is previously stored as offset data of a pixel unit (stored data 31) in the ROM 106. The right side in FIG. 18 is an image output that is obtained after the correction (the subtraction processing) is performed using the offset data (the stored data 31). Thus, the shadings of the focus detection images (the A and B images) can also be in a flat state. Since the processing for the focus detection image (the B image) that is obtained by collecting the focus detection image $S_{HB}$ is the same as that of the case of the A image, descriptions of the processing are omitted. In addition, offset data (stored data 32) for the focus detection image (the B image) are separately stored, and the stored data 32 are used at the time of correcting the B image.

Thus, the image pickup element 101 of the present embodiment includes the light-shielded reference region (the calculation region) and the opening region, and only apart of the plurality of image pickup pixels is included in the reference region. The DSP 103b (the signal processor) calculates the first correction data (the stored data 1) for the signal (the first pixel signal) from the image pickup pixel in the reference region. Then, the common pixel shading correction portion 3031 (the first shading correction portion) of the DSP 103b performs the shading correction for the first pixel signal from the opening region using the first correction data. The focus detection pixel offset correction portion 3034 (the second shading correction portion) of the DSP 103b performs the shading correction for the second pixel signal using the previously-stored correction data (the stored data 31 and 32) for each of the plurality of focus detection pixels.

According to the present embodiment, performing the correction using different offset data for each of the outputs of the common pixel (the image pickup pixel) and the special pixel (the focus detection pixel), the accuracy of extracting a signal component of the focus detection pixel can be improved. In the present embodiment, since the reference shift of the focus detection pixel can be reduced in a pixel unit, a plurality of drive patterns do not need to be used. In the present embodiment, for convenience of descriptions, the shading (the offset) in the dark situation is described, but the present embodiment is not limited to this. For example, the embodiment can also be applied to a correction for shading which is generated by light.

According to each embodiment described above, an image pickup apparatus and a signal processing method that reduce deterioration of an image quality can be provided by performing an appropriate shading correction with respect to a pixel output from an image pickup element having an image pickup pixel and a focus detection pixel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in each embodiment described above, the focus detection pixel is described as a special pixel, but each embodiment can also be applied to another special pixel that is used for a usage such as temperature detection or light source detection that is different from the usage of the image pickup pixel that is the common pixel.

This application claims the benefit of Japanese Patent Application No. 2012-081787, filed on Mar. 30, 2012, which is hereby incorporated by reference herein in its entirety.

What is claimed is:

1. An image pickup apparatus comprising:
   an image pickup element including a reference region, a plurality of first image pickup pixel portions that perform a photoelectric conversion and a plurality of second pixel portions that are formed so that an opening region of a photoelectric conversion area corresponding to a microlens for the second pixel portion is smaller than an opening region of a photoelectric conversion area corresponding to a microlens for the first image pickup pixel portion; and
   a signal processor configured to perform a shading correction for a pixel signal from the image pickup element,
   wherein, in an output mode, the image pickup element generates and outputs a first pixel signal by combining signals from the plurality of first image pickup pixel portions, and generates and outputs a second pixel signal without combining a signal from the second pixel portions, and
   wherein, in the output mode, the signal processor performs a first correction for the first pixel signal and the second pixel signal using shading correction data based on a pixel signal from the reference region, and performs a second correction only for the second pixel signal using additional shading correction data different from the shading correction data in the first correction.

2. The image pickup apparatus according to claim 1, wherein, in the output mode, the signal processor performs the first correction, and thereafter performs the second correction for a corrected signal of the second pixel signal which is corrected with the first correction.

3. The image pickup apparatus according to claim 2, wherein the signal processor performs focus detection using a signal obtained by performing the first correction and the second correction for the second pixel signal.

4. The image pickup apparatus according to claim 1, wherein the correction data in the second correction is previously stored.

5. The image pickup apparatus according to claim 1, wherein the signal processor performs focus detection using a signal obtained by performing the second correction.

6. The image pickup apparatus according to claim 1, wherein the additional shading correction data includes remaining amount of the shading correction for the second pixel signal.

7. The image pickup apparatus according to claim 1, wherein the signal processor performs a defect correction for the second pixel signal after the signal processor performs the first correction to output an image data.

8. The image pickup apparatus according to claim 1, wherein the additional shading correction data are previously stored in a memory, and the additional shading correction data is correction data relating to a difference between the first and second pixel signals.

9. A signal processing method of processing a pixel signal from an image pickup element including a reference region, a plurality of first image pickup pixel portions that perform a photoelectric conversion and a plurality of second pixel portions that are formed so that an opening region of a photoelectric conversion area corresponding to a microlens for the second pixel portion is smaller than an opening region of a photoelectric conversion area corresponding to a microlens for the first image pickup pixel portion, the signal processing method comprising the steps of:
   in an output mode, generating and outputting a first pixel signal by combining signals from the plurality of first image pickup pixel portions, and generating and outputting a second pixel signal without combining a signal from the second pixel portions; and
   in the output mode, performing a first correction for the first pixel signal and the second pixel signal using shading correction data based on a pixel signal from the light-shielded reference region, and performing a second correction only for the second pixel signal using additional shading correction data different from the shading correction data in the first correction.

10. An image pickup apparatus comprising:
    an image pickup element including a reference region, a plurality of first image pickup pixel portions for an image formed by a light beam from an image pickup optical system and a plurality of second pixel portions for focus detection;
    a signal processor configured to perform a shading correction for a pixel signal from the image pickup element;
    wherein, in an output mode, the image pickup element generates and outputs a first pixel signal by combining signals from the plurality of first image pickup pixel portions, and generates and outputs a second pixel signal without combining a signal from the second pixel portions, and
    wherein, in the output mode, the signal processor performs a first correction for the first pixel signal and the second pixel signal using correction data based on a pixel signal from the reference region, and performs a second correction only for the second pixel signal using additional shading correction data different from the correction data in the first correction.

11. The image pickup apparatus according to claim 10, wherein, in the output mode, the signal processor performs the first correction, and thereafter performs the second correction for a corrected signal of the second pixel signal which is corrected with the first correction.

12. The image pickup apparatus according to claim 11, wherein the signal processor performs focus detection using a signal obtained by performing the first correction and the second correction for the second pixel signal.

13. The image pickup apparatus according to claim 10, wherein the correction data in the second correction is previously stored.

14. The image pickup apparatus according to claim 10, wherein the signal processor performs focus detection using a signal obtained by performing the second correction.

15. The image pickup apparatus according to claim 10, wherein the additional shading correction data includes remaining amount of the shading correction for the second pixel signal.

16. The image pickup apparatus according to claim 10, wherein the signal processor performs a defect correction for the second pixel signal after the signal processor performs the first correction to output an image data.

17. An image pickup apparatus comprising:
an image pickup element including a reference region, a plurality of first image pickup pixel portions that perform a photoelectric conversion and a plurality of second pixel portions that are formed so that an opening region of a photoelectric conversion area corresponding to a microlens for the second pixel portion is smaller than an opening region of a photoelectric conversion area corresponding to a microlens for the first image pickup pixel portion; and
a signal processor configured to perform a shading correction for a pixel signal from the image pickup element,
wherein, in an output mode, the image pickup element generates and outputs a first pixel signal by combining signals from the plurality of first image pickup pixel portions, and generates and outputs a second pixel signal without combining a signal from the second pixel portions, and
wherein, in the output mode, the first pixel signal is corrected using shading correction data based on a pixel signal from the reference region, and the second pixel signal is corrected using the shading correction data and additional shading correction data relating to a difference between the first and second pixel signals.

* * * * *